United States Patent
Takatori

(10) Patent No.: US 11,785,173 B2
(45) Date of Patent: Oct. 10, 2023

(54) VIDEO PROCESSING DEVICE, VIDEO PROCESSING METHOD, VIDEO GENERATION DEVICE, VIDEO GENERATION METHOD, AND RECORDING MEDIUM

(71) Applicant: Panasonic Intellectual Property Management Co., Ltd., Osaka (JP)

(72) Inventor: Masahiro Takatori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/795,757

(22) PCT Filed: Apr. 12, 2021

(86) PCT No.: PCT/JP2021/015159
§ 371 (c)(1),
(2) Date: Jul. 27, 2022

(87) PCT Pub. No.: WO2021/235138
PCT Pub. Date: Nov. 25, 2021

(65) Prior Publication Data
US 2023/0076845 A1    Mar. 9, 2023

(30) Foreign Application Priority Data

May 22, 2020   (JP) .................................. 2020-089775

(51) Int. Cl.
H04N 5/205    (2006.01)
H04N 19/117   (2014.01)
(Continued)

(52) U.S. Cl.
CPC .......... *H04N 5/205* (2013.01); *H04N 19/117* (2014.11); *H04N 19/12* (2014.11); *H04N 19/122* (2014.11);
(Continued)

(58) Field of Classification Search
CPC ........ G09G 5/36; H04N 19/117; H04N 19/12; H04N 19/122; H04N 19/134;
(Continued)

(56) References Cited

U.S. PATENT DOCUMENTS

| | | | |
|---|---|---|---|
| 8,593,480 B1 | 11/2013 | Ballestad et al. | |
| 2009/0180030 A1* | 7/2009 | Shin ........................ | H04N 9/77 348/E7.001 |

(Continued)

FOREIGN PATENT DOCUMENTS

| | | | |
|---|---|---|---|
| JP | 2013-258682 A | 12/2013 | |
| JP | 2014-512740 A | 5/2014 | |

(Continued)

OTHER PUBLICATIONS

International Search Report issued in corresponding International Patent Application No. PCT/JP2021/015159, dated Jun. 22, 2021, with English translation.

*Primary Examiner* — Mohammed S Rahaman
(74) *Attorney, Agent, or Firm* — McDermott Will & Emery LLP

(57) ABSTRACT

A video processing device includes an acquirer that acquires video data via a predetermined transmission line, the video data including video and metadata that indicates a first frequency band that is a spatial frequency range in which the video is present; an adjuster that makes sharpness gain adjustment to video such that, among a plurality of regions of the video included in the video data acquired by the acquirer, a sharpness gain for a first region that belongs to (Continued)

the first frequency band indicated by the metadata exceeds a sharpness gain for a second region that belongs to a second frequency band that is a range outside the first frequency band; and an output device that outputs video adjusted by the adjuster.

22 Claims, 19 Drawing Sheets

(51) Int. Cl.
    *H04N 19/12*     (2014.01)
    *H04N 19/122*     (2014.01)
    *H04N 19/134*     (2014.01)
    *H04N 19/169*     (2014.01)
    *H04N 5/14*     (2006.01)

(52) U.S. Cl.
    CPC ......... *H04N 19/134* (2014.11); *H04N 19/188* (2014.11); *H04N 5/142* (2013.01)

(58) Field of Classification Search
    CPC ............... H04N 19/188; H04N 21/435; H04N 21/4402; H04N 5/142; H04N 5/20; H04N 5/205

See application file for complete search history.

(56) References Cited

U.S. PATENT DOCUMENTS

| | | | |
|---|---|---|---|
| 2012/0008050 A1* | 1/2012 | Hirono | H04N 5/20 348/671 |
| 2015/0007243 A1 | 1/2015 | Kunkel et al. | |
| 2015/0103214 A1* | 4/2015 | Chen | G06T 5/003 348/252 |
| 2015/0125090 A1 | 5/2015 | Mizobuchi et al. | |
| 2016/0100147 A1* | 4/2016 | Kim | H04N 5/20 386/242 |

FOREIGN PATENT DOCUMENTS

| | | |
|---|---|---|
| JP | 2015-517233 A | 6/2015 |
| WO | 2012/125802 A1 | 9/2012 |
| WO | 2013/130478 A1 | 9/2013 |

\* cited by examiner

FIG. 13

Sharpness gain table

| | H0 | H1 | H3 | H3 | H4 |
|---|---|---|---|---|---|
| V4 | 0 | 0 | 0 | 0 | 0 |
| V3 | 0 | G | H | I | 0 |
| V2 | 0 | D | E | F | 0 |
| V1 | 0 | A | B | C | 0 |
| V0 | 0 | 0 | 0 | 0 | 0 |

Detail set data

| Type | Plain region | Detail region | Edge region |
|---|---|---|---|
| Offset value | ±0 | +X | ±0 |

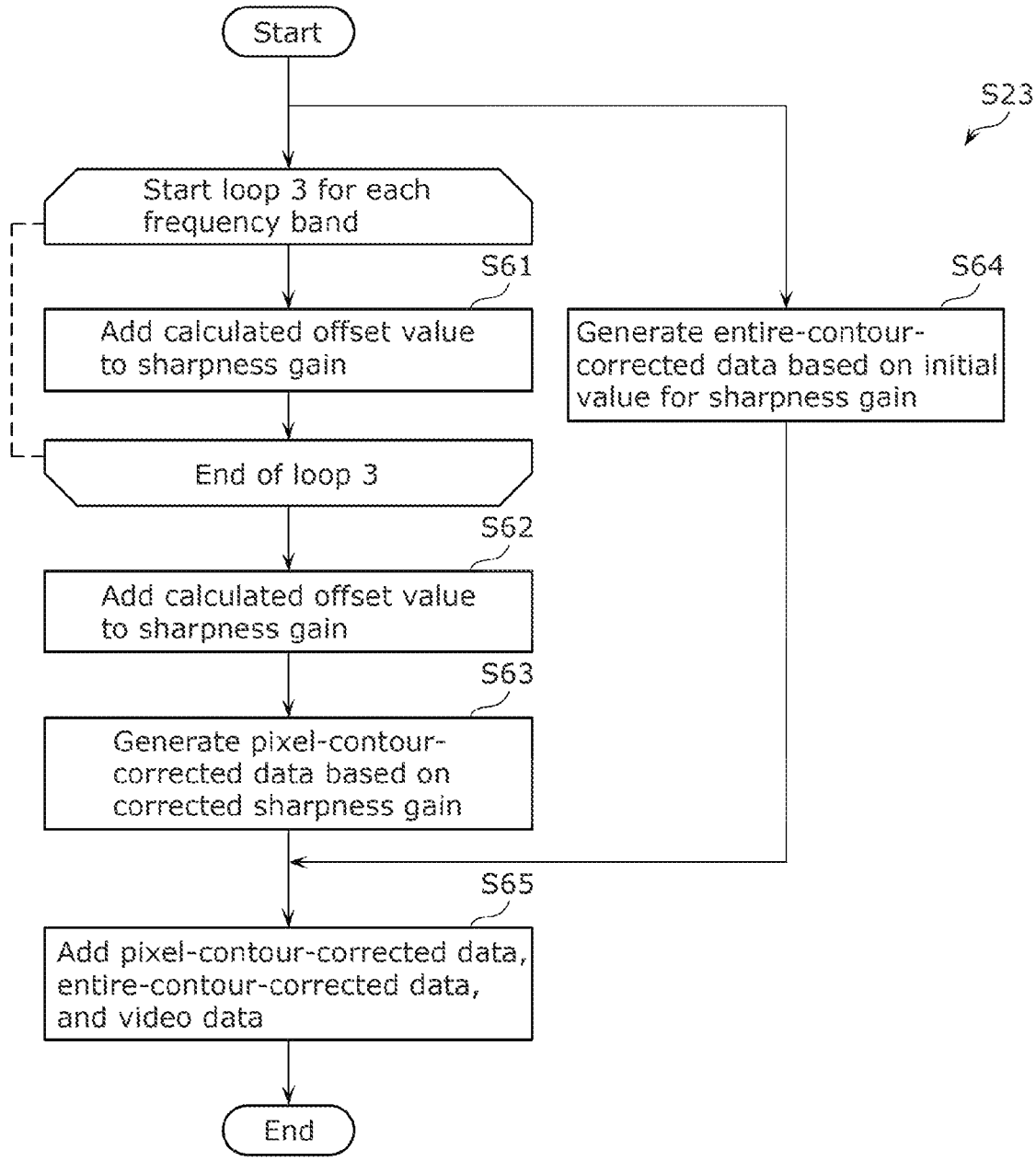

VIDEO PROCESSING DEVICE, VIDEO PROCESSING METHOD, VIDEO GENERATION DEVICE, VIDEO GENERATION METHOD, AND RECORDING MEDIUM

CROSS-REFERENCE TO RELATED APPLICATIONS

This application is the U.S. National Phase under 35 U.S.C. § 371 of International Patent Application No. PCT/JP2021/015159, filed on Apr. 12, 2021, which in turn claims the benefit of Japanese Patent Application No. 2020-089775, filed on May 22, 2020, the entire content of each of which is incorporated herein by reference.

TECHNICAL FIELD

The present disclosure relates to a video processing device, a video processing method, and a recording medium for making sharpness gain adjustment to video, or relates to a video generation device, a video generation method, and a recording medium for generating video data including metadata.

BACKGROUND ART

Patent Literature (PTL) 1 discloses a video processing device for performing edge enhancement by making shoot components small for frames that have a higher proportion of pixels in video and whose differences in luminance from adjacent pixels are greater than or equal to a predetermined first value.

CITATION LIST

Patent Literature

[PTL 1]
Japanese Unexamined Patent Application Publication (Translation of PCT Application) No. 2014-512740

SUMMARY OF INVENTION

Technical Problem

The present disclosure provides a video processing device and so on capable of suppressing the amplification of noise caused by achieving sharpness gains.

Solution to Problem

A video processing device according to one aspect of the present disclosure includes an acquirer that acquires video data that includes video and metadata, the metadata indicating a first frequency band that is a spatial frequency range in which the video is present, an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band, and an output device that outputs video adjusted by the adjuster.

A video processing method according to one aspect of the present disclosure is a video processing method performed by a video processing device for making sharpness gain adjustment to video. The video processing method includes acquiring video data that includes video and metadata, the metadata indicating a first frequency band that is a spatial frequency range in which the video is present, making sharpness gain adjustment to the video such that, among a plurality of regions of the video included in the video data acquired, a sharpness gain for a first region that belongs to the first frequency band indicated by the metadata exceeds a sharpness gain for a second region that belongs to a second frequency band that is a range outside the first frequency band, and outputting adjusted video.

A video generation device according to one aspect of the present disclosure includes a specifier that specifies a first frequency band that is a spatial frequency range in which video is present, a generator that generates video data that includes the video and metadata, the metadata indicating the first frequency band specified, and an output device that outputs the video data generated.

A video generation method according to one aspect of the present disclosure is a video generation method performed by a video generation device for generating video data that includes metadata. The video generation method includes specifying a first frequency band that is a spatial frequency range in which video is present, generating video data that includes the video and metadata, the metadata indicating the first frequency band specified, and outputting the video data generated.

It is to be noted that general or specific aspects of the present disclosure may be realized by a system, an integrated circuit, a computer program, or a computer-readable recording medium such as a CD-ROM, or may be realized by any combination of a system, an integrated circuit, a computer program, and a non-transitory recording medium.

Advantageous Effects of Invention

The video processing device and so on according to the present disclosure are capable of suppressing the amplification of noise caused by achieving sharpness gains.

BRIEF DESCRIPTION OF DRAWINGS

FIG. 13 illustrates a table showing an offset value for the sharpness gain for each region.

FIG. 27 is a flowchart of processing for making sharpness gain adjustment to video data.

DESCRIPTION OF EMBODIMENTS

[Circumstances Leading to Present Disclosure]

Figure 1:
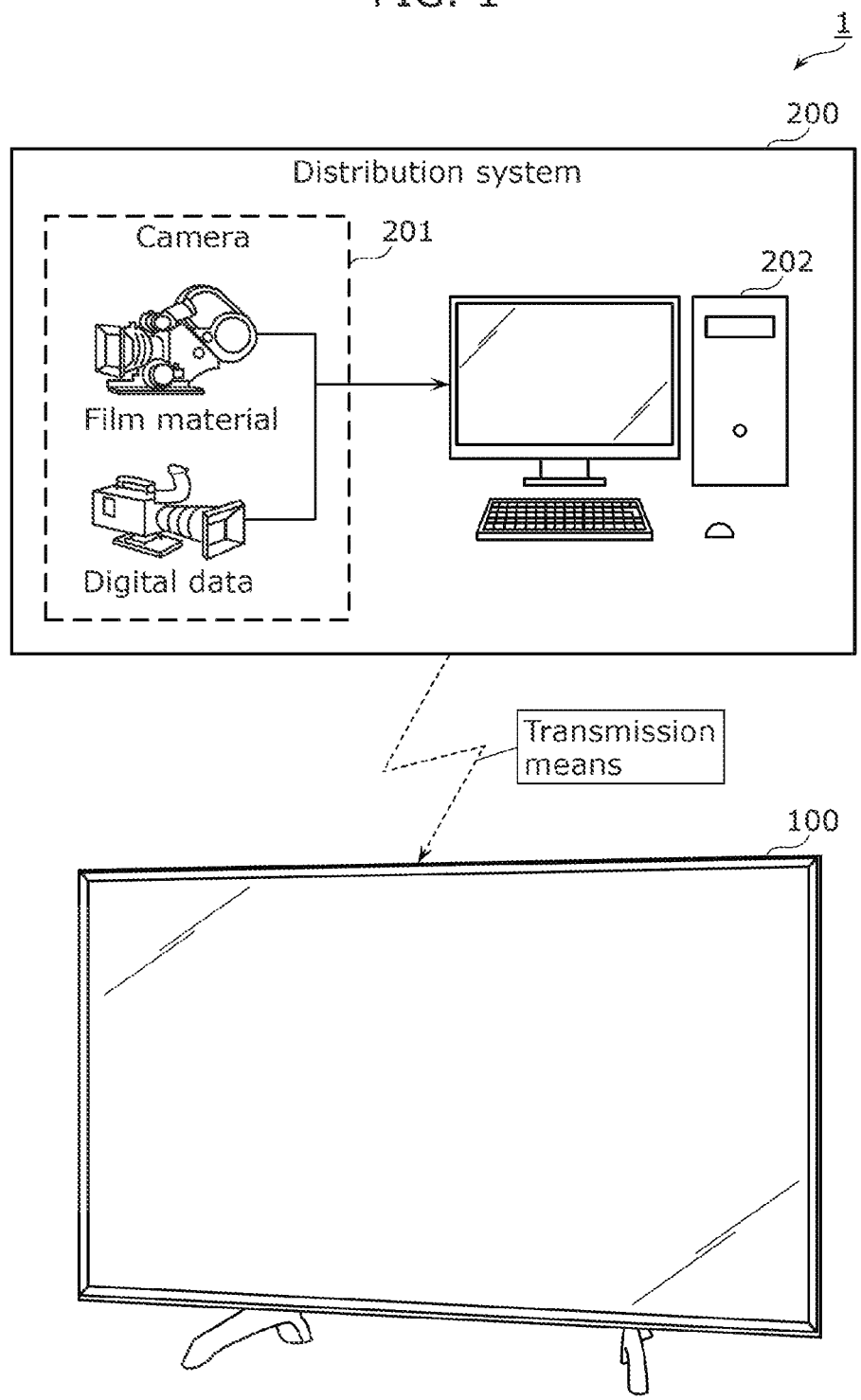
FIG. 1 illustrates an overview of a video system according to an embodiment of the present disclosure.

The inventors of the present disclosure have found that the following problems arise with the video processing device described in "Background Art".

A video processing device acquires video data generated on the distribution side and decodes the acquired video data to perform processing for achieving sharpness gains on the decoded video data. The video processing device acquires the video data via, for example, a predetermined transmission means, so that the acquired video data may contain noise caused by the influence of the predetermined transmission means. The video data decoded by the video processing device may also contain noise caused by encoding in the distribution system or noise caused by decoding in the video processing device. Thus, video that is ultimately output for display may contain noise caused during a period of time from when video obtained by image capturing is encoded in the distribution system to when the encoded video is decoded in the video processing device. In this case, since the video data contains noise, if the video processing device performs processing for achieving sharpness gains on the decoded video data, the contour of the noise contained in the video data is emphasized and the noise may become more noticeable.

In view of this, the present disclosure provides a video processing device and so on capable of suppressing the amplification of noise caused by achieving sharpness gains.

A video processing device according to one aspect of the present disclosure includes an acquirer that acquires video data that includes video and metadata, the metadata indicating a first frequency band that is a spatial frequency range in which the video is present, an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band, and an output device that outputs video adjusted by the adjuster.

Accordingly, sharpness gain adjustment to the video data is made so as to prevent the sharpness gain for the second region belonging to the second frequency band from exceeding the sharpness gain for the first region. Thus, during execution of the processing for achieving sharpness gains, it is possible to prevent the noise that belongs to the second frequency band and that is caused during a period of time from when video obtained by image capturing is encoded in the distribution system to when the encoded video is decoded in the video processing device, from being amplified more than in the first region. This reduces the possibility that the noise becomes more noticeable than the other part of the video due to the execution of the processing for achieving sharpness gains.

The second frequency band may be included in a range of frequencies lower than a minimum frequency that defines the first frequency band or in a range of frequencies higher than a maximum frequency that defines the first frequency band.

Accordingly, sharpness gain adjustment to the video data is made such that the sharpness gain for the second region that belongs to the second frequency band included in the range of frequencies lower than the minimum frequency defining the first frequency band or in the range of frequencies higher than the maximum frequency defining the first frequency band is prevented from exceeding the sharpness gain for the first region.

The adjuster may make sharpness gain adjustment to the video by adding a first offset value to the sharpness gain for the second region, the first offset value being a value less than or equal to a first threshold value.

Accordingly, sharpness gain adjustment to the video data is made so as to lower or not to raise the sharpness gain for the second region belonging to the second frequency band in which the video is not present. Thus, during execution of processing for achieving sharpness gains, it is possible to suppress the amplification of noise that belongs to the second frequency band and that is caused during a period of time from when video obtained by image capturing is encoded in the distribution system to when the encoded video is decoded in the video processing device. In particular, because in many cases noise is contained in frequency bands higher than a predetermined frequency, degradation in image quality can be suppressed more effectively by making sharpness gain adjustment to the video data so as to lower or not to raise the sharpness gain for the second region belonging to the second frequency band.

The adjuster may make sharpness gain adjustment to the video by adding a second offset value to the sharpness gain for the first region, the second offset value being a value greater than the first threshold value.

This improves the sharpness gain for the first region in which the video is present and thus effectively improves image quality.

The first frequency band may include a plurality of ranges different from each other, the second offset value may include a plurality of third offset values that correspond respectively to the plurality of ranges, and the adjuster may count, for each of the plurality of ranges, a total number of pixels that belong to the range, and determine the plurality of third offset values such that a greater value is assigned to a range for which a greater number of pixels is counted among the plurality of ranges.

Accordingly, the sharpness gain improves with increasing number of pixels. This effectively improves image quality.

The first threshold value may be zero.

The adjuster may be further configured to calculate a maximum difference for each of a plurality of pixels in the video in accordance with pixel values of a plurality of pixels included within a predetermined width in a horizontal or vertical direction with the pixel as a reference, and make sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range.

Accordingly, sharpness gain adjustment is made such that the sharpness gain for the first pixel that is easy to improve image quality by raising the sharpness gain exceeds the sharpness gain for the second pixel. This effectively improves image quality.

The maximum difference that is within the predetermined range may be a value smaller than the maximum difference that is outside the predetermined range or a value greater than the maximum difference that is outside the predetermined range.

The fourth offset value may be a value greater than zero, and the fifth offset value may be zero.

A video processing method according to one aspect of the present disclosure is a video processing method performed by a video processing device for making sharpness gain adjustment to video. The video processing method includes acquiring video data that includes video and metadata, the metadata indicating a first frequency band that is a spatial frequency range in which the video is present, making sharpness gain adjustment to the video such that, among a plurality of regions of the video included in the video data acquired, a sharpness gain for a first region that belongs to the first frequency band indicated by the metadata exceeds a sharpness gain for a second region that belongs to a second frequency band that is a range outside the first frequency band, and outputting adjusted video.

Accordingly, sharpness gain adjustment to the video data is made so as to prevent the sharpness gain for the second region belonging to the second frequency band in which the video is not present from exceeding the sharpness gain for the first region. Thus, during execution of the processing for achieving sharpness gains, it is possible to prevent the noise that belongs to the second frequency band and that is caused during a period of time from when video obtained by image capturing is encoded in the distribution system to when the encoded video is decoded in the video processing device, from being amplified more than in the first region. This reduces the possibility that the noise becomes more noticeable than the other part of the video due to the execution of the processing for achieving sharpness gains.

A video generation device according to one aspect of the present disclosure includes a specifier that specifies a first frequency band that is a spatial frequency range in which video is present, a generator that generates video data that includes the video and metadata, the metadata indicating the first frequency band specified, and an output device that outputs the video data generated.

In this way, since the video data that includes the metadata indicating the first frequency band is output, the video processing device that receives this video data is capable of easily performing the processing for suppressing the amplification of noise caused by achieving sharpness gains.

A video generation method according to one aspect of the present disclosure is a video generation method performed by a video generation device for generating video data that includes metadata. The video generation method includes specifying a first frequency band that is a spatial frequency range in which video is present, generating video data that includes the video and metadata, the metadata indicating the first frequency band specified, and outputting the video data generated.

In this way, since the video data that includes the metadata indicating the first frequency band is output, the video processing device that receives this video data is capable of easily performing the processing for suppressing the amplification of noise caused by achieving sharpness gains.

It is to be noted that general or specific aspects of the present invention may be realized by a system, an integrated circuit, a computer program, or a computer-readable recording medium such as a CD-ROM, or may be realized by any combination of a system, an integrated circuit, a computer program, and a non-transitory recording medium.

Hereinafter, detailed description of embodiments will be given with reference to the drawings as appropriate. However, detailed description more than necessary may be omitted. For example, detailed description of well-known matter and redundant description of substantially identical constituent elements may be omitted. This is to avoid unnecessary redundancy of the following description and to facilitate understanding for persons skilled in the art.

Note that the accompanying drawings and the following description are provided to help persons skilled in the art to better understand the present disclosure, and do not intend to limit the subject matter of claims by these drawings and the description.

Embodiment

One embodiment will be described hereinafter with reference to FIGS. 1 to 14.

1. Configuration

FIG. 1 illustrates an overview of a video system according to the present embodiment.

As illustrated in FIG. 1, video system 1 includes distribution system 200 that distributes distribution data, and display system 100 that receives distributed distribution data.

Distribution system 200 includes camera 201 and information processing device 202. Information processing device 202 converts video captured by camera 201 such as a video camera into distribution data that is transmitted to display system 100 and transmits the distribution data to display system 100 via a transmission means. The distribution data may be encoded data obtained by compressing (encoding) video data, or may be encoded data generated by compressing and then multiplexing video data and voice data.

The transmission means as used herein refers to a means for sending broadcast waves that are compliant with predetermined television broadcast standards, a means for distributing data via a network such as the Internet according to a predetermined communication protocol, or a means for recording data on a predetermined packaged medium and selling the predetermined packaged medium. The present embodiment describes, by way of example, the case of using the means for sending broadcast waves that are compliant with predetermined television broadcast standards as the transmission means.

Display system 100 receives distribution data and displays video indicated by video data included in the received distribution data. Display system 100 has an outer appearance of a common flat panel display that houses a display device including a display panel in a casing. Display system 100 may, for example, be a liquid crystal display or an organic EL display.

Note that display system 100 is one example of a video processing device. Information processing device 202 is one example of a video generation device.

Figure 2:
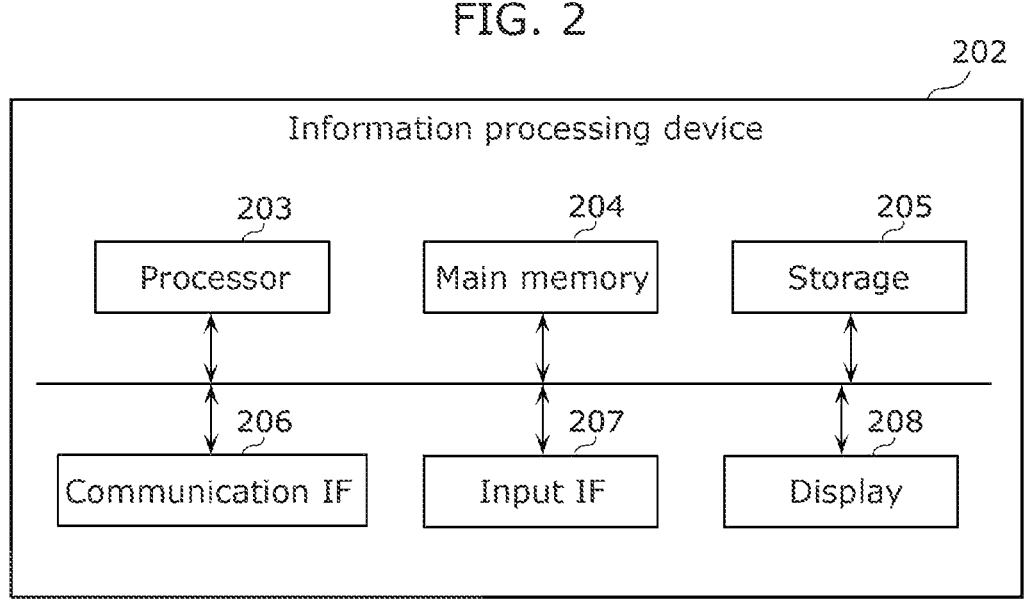
FIG. 2 is a block diagram showing one example of a hardware configuration of an information processing device according to the embodiment.

FIG. 2 is a block diagram showing one example of a hardware configuration of the information processing device according to the present embodiment.

As illustrated in FIG. 2, information processing device 202 includes, as the hardware configuration, processor 203, main memory 204, storage 205, communication interface (IF) 206, input interface (IF) 207, and display 208.

Processor 203 executes programs stored in storage 205 or other devices

Main memory 204 serves as a volatile storage region that is used as a work region by processor 203 when executing programs.

Storage 205 serves as a non-volatile storage region that stores various types of data such as programs.

Communication IF 206 is a communication interface that transmits and receives data to and from external equipment such as camera 201. Communication IF 206 may, for example, be an interface for wireless communication such as a wireless LAN interface or a Bluetooth (registered trademark) interface. Communication IF 206 may also be an interface for wired communication such as an universal serial bus (USB) or a wired LAN interface. Note that communication IF 206 is not limited to the examples described above, and may be a communication interface that transmits and receives data to and from external equipment via a communication network. Communication IF 206 may also serve as a reader that reads data stored in a storage medium such as a memory card from the storage medium. Information processing device 202 has a communication connection with camera 201 via communication IF 206 and acquires video data from camera 201 via communication IF 206.

Input IF 207 is an interface for accepting input from humans. Input IF 207 may be a pointing device such as a mouse, a touch pad, a touch panel, or a track ball, or may be a keyboard.

Display 208 serves as a master monitor that displays video indicated by video data for mastering of the video data. Display 208 may, for example, be a liquid crystal display or an organic EL display.

Figure 3:
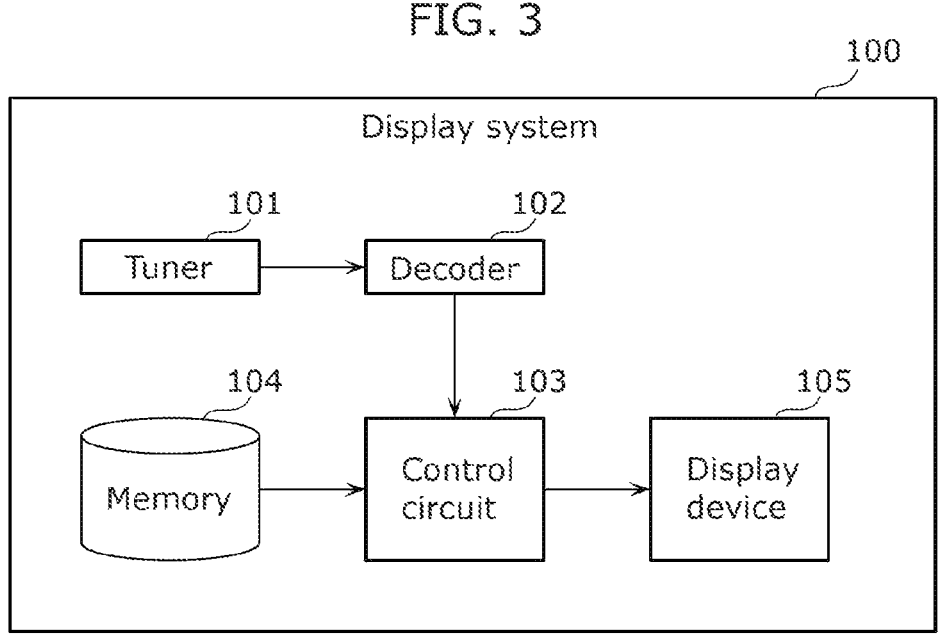
FIG. 3 is a block diagram showing one example of a hardware configuration of a display system according to the embodiment.

FIG. 3 is a block diagram showing one example of a hardware configuration of the display system according to the present embodiment.

As illustrated in FIG. 3, display system 100 includes tuner 101, decoder 102, control circuit 103, memory 104, and display device 105.

Tuner 101 converts analog signals that configure broadcast waves received from an antenna (not shown) into encoded data, i.e., digital signals, and outputs the encoded data obtained by the conversion to decoder 102.

Decoder 102 decodes encoded data acquired from tuner 101 and outputs video data obtained by the decoding to control circuit 103. In the case where the encoded data is multiplexed, decoder 102 may demultiplex the encoded data into encoded data for video and encoded data for voice and decode the demultiplexed data into video data and voice data. Decoder 102 may acquire metadata serving as additional data on the video data, together with the video data from tuner 101 and decode the acquired metadata. The decoded metadata is once written to memory 104 by control circuit 103 described later. The metadata is previously added to the video data and transmitted by distribution system 200.

Control circuit 103 performs video processing on video data that is output from decoder 102, in accordance with the metadata. Control circuit 103 outputs video obtained by the video processing to display device 105. Thus, display device 105 is capable of displaying video that conforms to both of the metadata and the properties of display device 105. Note that decoder 102 and control circuit 103 may be realized by one circuit. Control circuit 103 may be realized by a general-purpose processor such as a CPU that executes a predetermined program, or may be realized by a dedicated circuit. That is, the functions of display system 100, which will be described later, may be realized by software, or may be realized by hardware.

Memory 104 may store control programs. For example, memory 104 may be a non-volatile memory.

Display device 105 displays video that is output from control circuit 103. Display device 105 may be a display panel and configured by, for example, a liquid crystal panel or an organic EL panel.

Figure 4:
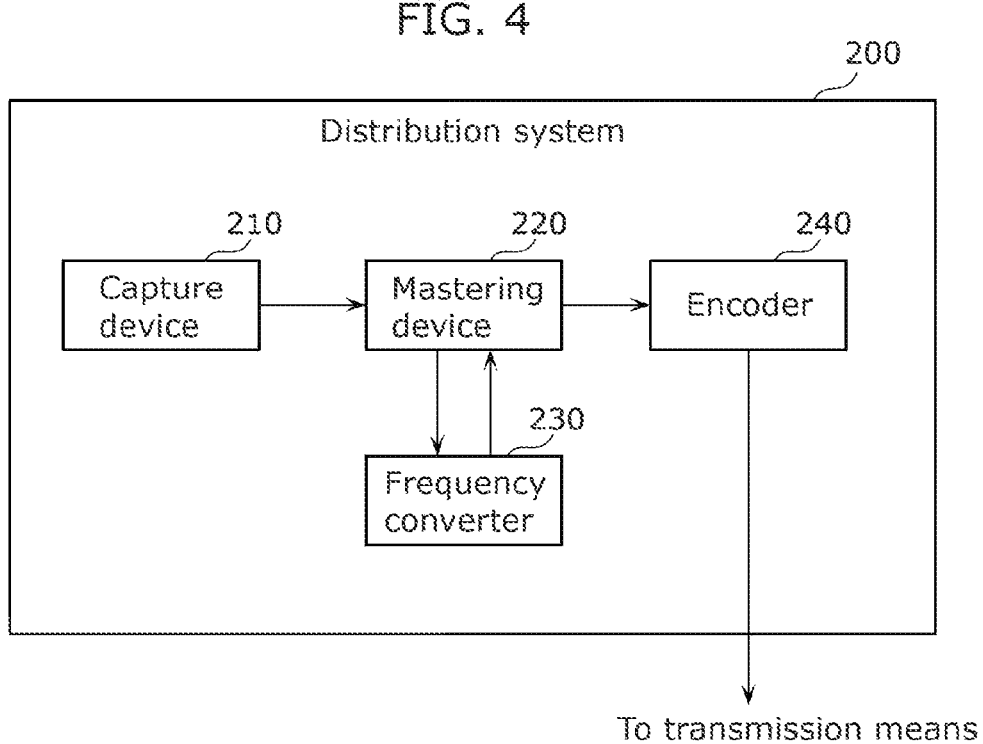
FIG. 4 is a block diagram showing one example of a configuration of a distribution system according to the embodiment.

FIG. 4 is a block diagram showing one example of a functional configuration of the distribution system according to the present embodiment.

As illustrated in FIG. 4, distribution system 200 includes capture device 210, mastering device 220, frequency converter 230, and encoder 240.

Capture device 210 acquires video data about a subject captured by camera 201 and outputs the acquired video data. Capture device 210 may be realized by, for example, camera 201 and communication IF 206 connected to camera 201.

Mastering device 220 sets MAX CF (maximum video horizontal frequency or maximum video vertical frequency) or MIN CF (minimum video horizontal frequency or minimum video vertical frequency) in accordance with input from a producer, and generates video data that indicates video corresponding to the set MAX CF and/or MIN CF. For example, mastering device 220 may generate master data, i.e., video data indicating video for distribution, by executing processing for adjusting video so as to have MAX CF and MIN CF intended by the video producer in accordance with input from the producer, while displaying video data obtained from capture device 210 on the master monitor.

Specifically, mastering device 220 may generate master data such that frequency components included in video data fall within a range from MIN CF to MAX CF, which are set in accordance with input, by performing a filtering process of cutting frequency components outside the aforementioned range. Mastering device 220 may also set a minimum frequency among horizontal frequency components included in video data to MIN CHF and set a maximum frequency among the horizontal frequency components to MAX CHF. Similarly, mastering device 220 may set a minimum frequency among vertical frequency components included in video data to MIN CVF and set a maximum frequency among the vertical frequency components to MAX CVF.

This enables the producer to generate master data while checking video displayed and being edited on the master monitor (not shown) and horizontal/vertical frequency distribution data obtained by frequency conversion. Mastering device 220 specifies MAX CHF, MAX CVF, MIN CHF, and MIN CVF that are obtained by frequency setting as effective frequency bands in which the video is present. The effective frequency bands are one example of the first frequency band.

Mastering device 220 may set MAX CF and MIN CF so as to filter frequency bands (e.g., HHLL, HHLH, HHHL, and HHHH) in which the video is not present. For example, the frequency bands in which the video is not present may be set in accordance with input made by the producer who is checking the distribution of a plurality of ranges obtained by frequency division of the video (e.g., 16 ranges in total, including four ranges in each horizontal row and four ranges in each vertical column). For example, mastering device 220 may set MAX CHF to 0.75, MAX CVF to 1.00, MIN CHF to 0, and MIN CVF to 0.25. Note that MAX CHF corresponds to MAX CF in the horizontal direction, MAX CVF corresponds to MAX CF in the vertical direction, MIN CHF corresponds to MIN CF in the horizontal direction, and MIN CF corresponds to MIN CVF in the vertical direction. MAX CHF of 1.00 indicates ½ of horizontal clock frequencies of the video data. MAX CVF of 1.00 indicates ½ of vertical clock frequencies of the video data.

After frequency division of the video, mastering device 220 may synthesize the frequencies of videos in the plurality of ranges obtained by the frequency division. Mastering device 220 may also filter all or some of the videos in the plurality of ranges obtained by the frequency division and synthesize the frequencies of a plurality of videos obtained by the filtering. Note that some videos refer to n videos (n is a natural number) among the videos in the plurality of ranges. For example, mastering device 220 may serve as one of LLLL, LHLL, HLLL, HHLH, HHHL, and HHHH filters for the videos in the plurality of ranges obtained by frequency division and perform a filtering process of cutting the corresponding range or a filtering process of lowering the gain for the corresponding range.

Figure 5:
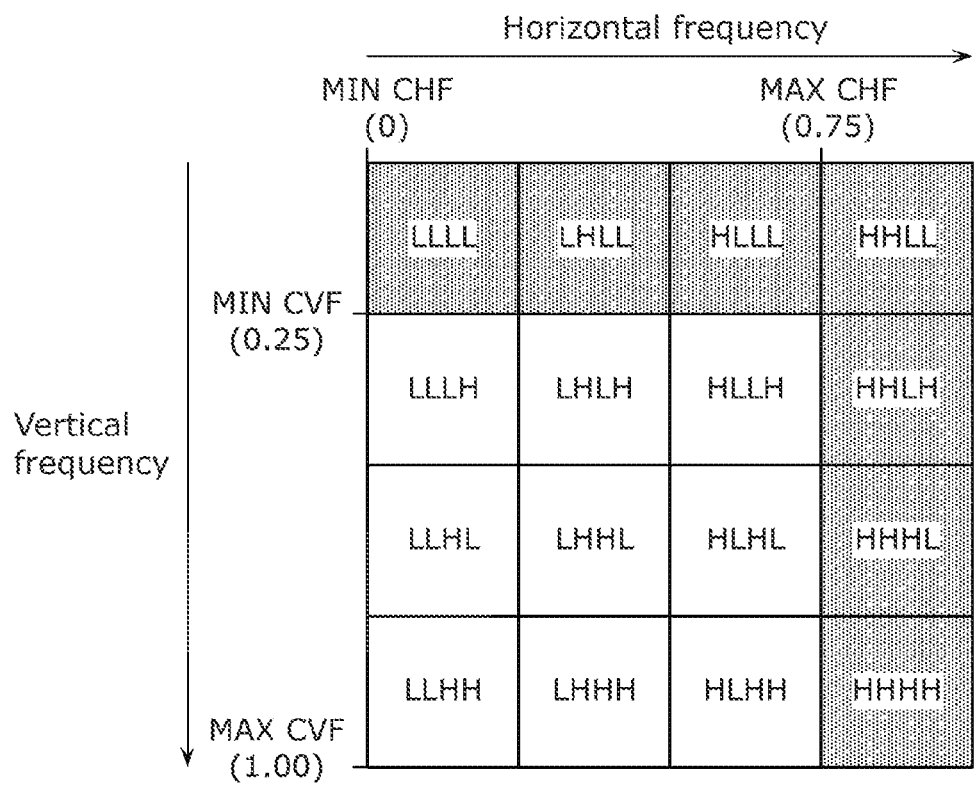
FIG. 5 illustrates a distribution of a plurality of regions obtained by frequency division of video according to the embodiment.

In the case where the frequency bands are divided into 16 ranges, each range is denoted by a four-digit character made by a combination of letters L and H as illustrated in FIG. 5. In the four-digit character combination indicating each range, the first two-digit character indicates the horizontal frequency band, and the latter two-digit character indicates the vertical frequency band. The two-digit character in each direction may indicate a higher-frequency range in the order of LL, LH, HL, and HH, for example.

Note that the frequency bands are not limited to being divided into 16 ranges in total, including four ranges in each horizontal row and four ranges in each vertical column, and may be divided into nine ranges in total, including three ranges in each horizontal row and three ranges in each vertical column. The number of divisions in the horizontal direction and the number of divisions in the vertical direction may be equal to each other, or may be different from each other.

Note that although mastering device 220 determines MAX CHF, MAX CVF, MIN CHF, and MIN CVF, at least one of MAX CHF, MAX CVF, MIN CHF, and MIN CVF may be determined because it is only necessary to indicate frequency bands in which the video is present.

As another alternative, mastering device 220 may generate master data, which is video data indicating video for distribution, by executing processing for adjusting video data such that the video is displayed with brightness and color shades intended by the video producer in accordance with input from the producer, while displaying video indicated by the video data obtained from capture device 210 on the master monitor.

Mastering device 220 may be realized by, for example, processor 203, main memory 204, and storage 205 of information processing device 202. Mastering device 220 is realized by processor 203 executing programs stored in storage 205 while using main memory 204.

Frequency converter 230 performs frequency division of video indicated by the video data adjusted by mastering device 220 and returns video data that indicates videos in a plurality of ranges obtained by the frequency division, to mastering device 220. For example, frequency converter 230 may perform frequency division of the video, using discrete cosine transform (DCT), discrete wavelet transform (DWT), or any other method. Frequency converter 230 may be realized by, for example, processor 203, main memory 204, and storage 205 of information processing device 202. Frequency converter 230 is realized by processor 203 executing programs stored in storage 205 while using main memory 204.

Encoder 240 generates video data by encoding master data generated by mastering device 220 and at least one of MAX CHF, MAX CVF, MIN CHF, and MIN CVF. Each of MAX CHF, MAX CVF, MIN CHF, and MIN CVF is metadata (frequency information) that indicates the frequency band in which the determined video is present. Encoder 240 encodes the master data according to video compression standards. Encoder 240 outputs video data that includes the metadata and encoded data for video obtained by the encoding, to the transmission line. Although not shown, the distribution data including the encoded data for video compressed and output by encoder 240 may include, in addition to the encoded data for video, encoded data for other types of media such as encoded data for voice or encoded data for subtitles. The metadata may include information other than the frequency information, such as information indicating a maximum luminance value and an average luminance value. Encoder 240 may be realized by, for example, processor 203, main memory 204, storage 205, and communication IF 206 of information processing device 202. Encoder 240 is realized by processor 203 executing programs stored in storage 205 while using main memory 204.

Note that although distribution system 200 adjusts video data such that the frequency band specified in accordance with input from the producer is set as a frequency band in which the video is present, the present disclosure is not limited to this example, and a frequency band in which the video is present may be specified by analyzing the frequency distribution of the video indicated by video data.

As described above, distribution system 200 generates video data that includes the set MAX CF and MIN CF as the metadata, and distributes distribution data (encoded data) obtained by encoding the generated video data. Thus, distribution system 200 is capable of indicating an effective frequency range in which the video of contents (hereinafter, referred to as "contents") is present in the video data indicating the contents. Note that, in the video data, frequency bands in which the contents (video) are present are referred to as effective frequency bands, and frequency bands in which the contents (video) are not present are referred to as ineffective frequency bands. The ineffective frequency bands are one example of the second frequency band.

Accordingly, by referencing the metadata indicating the effective frequency range, display system 100 on the reception side is capable of properly performing image-quality improvement processing such as contour correction processing or noise reduction processing, when displaying the video indicated by the video data. Specifically, display system 100 may perform, as the image-quality improvement processing, processing for lowering or nullifying gains in the contour correction processing performed on the ranges of high frequencies higher than or equal to MAX CF or processing for achieving gains in the noise reduction processing. Display system 100 may also perform, as the image-quality improvement processing, processing for lowering or nullifying gains in the contour correction processing performed on the ranges of low frequencies lower than or equal to MIN CF or processing for achieving gains in the noise reduction processing. By performing the image-quality improvement processing, display system 100 is capable of properly performing image-quality processing on the ineffective frequency bands for actual contents to be distributed. Accordingly, display system 100 is capable of reducing unnecessary noise components generated on the transmission line between distribution system 200 and display system 100 on the reception side, and is thus capable of effectively improving image quality such as resolution and definition in the effective frequency bands for video signal processing. Display system 100 is also capable of reducing noise caused during the encoding in distribution system 200 or noise caused during the decoding in display system 100.

In the encoding of the video data on the distribution side, MPEG2 or H.265 is widely used in applications such as television broadcasting and network distribution, and the rate of compression is improved by performing frequency conversion and horizontal and vertical frequency division on the video data and adjusting the quantization coefficient for each range. In the encoding, visual properties of humans, i.e., the inability to easily detect deterioration in high-resolution pattern areas, are used to lower or make zero the quantization coefficients for ranges with high frequency components (e.g., HHLL, HHLH, HHHL, and HHHH ranges illustrated in FIG. 5). This improves the rate of compression of the video data during encoding while suppressing degradation in image quality.

In order to achieve a considerable improvement in the rate of compression, it is also conceivable to also lower the quantization coefficients for ranges with low-frequency components that are apt to have increased amounts of information after frequency conversion (e.g., LLLL, LHLL, HLLL, and HHLL illustrated in FIG. 5).

As described above, by including the metadata in the video data on contents, distribution system 200 is capable of indicating frequency ranges that are to be compressed by lowering quantization coefficients. Therefore, display system 100 on the reception side is capable of referencing the frequency ranges indicated as the metadata by the video data and properly performing image-quality improvement processing such as contour correction processing and noise reduction processing when displaying the video included in the video data on the contents.

Specifically, display system 100 may perform, as the image-quality improvement processing, processing for lowering or nullifying gains in the contour correction processing performed on the ranges of high frequencies higher than or equal to MAX CF or processing for achieving gains in the noise reduction processing. Display system 100 may also perform, as the image-quality improvement processing, processing for lowering or nullifying gains in the contour correction processing performed on the ranges of low frequencies lower than or equal to MIN CF or processing for achieving gains in the noise reduction processing. By performing the image-quality improvement processing, display system 100 is capable of properly performing image-quality processing on frequency bands that will be deteriorated during encoding of the video data on the actual contents to be distributed, and is thus capable of effectively reducing unnecessary noise components generated during encoding processing of distribution system 200. By performing the image-quality improvement processing, display system 100 is also capable of effectively improving image quality such as resolution and definition in effective frequency bands in which the video is present.

Next, a functional configuration of the display system will be described.

Figure 6:
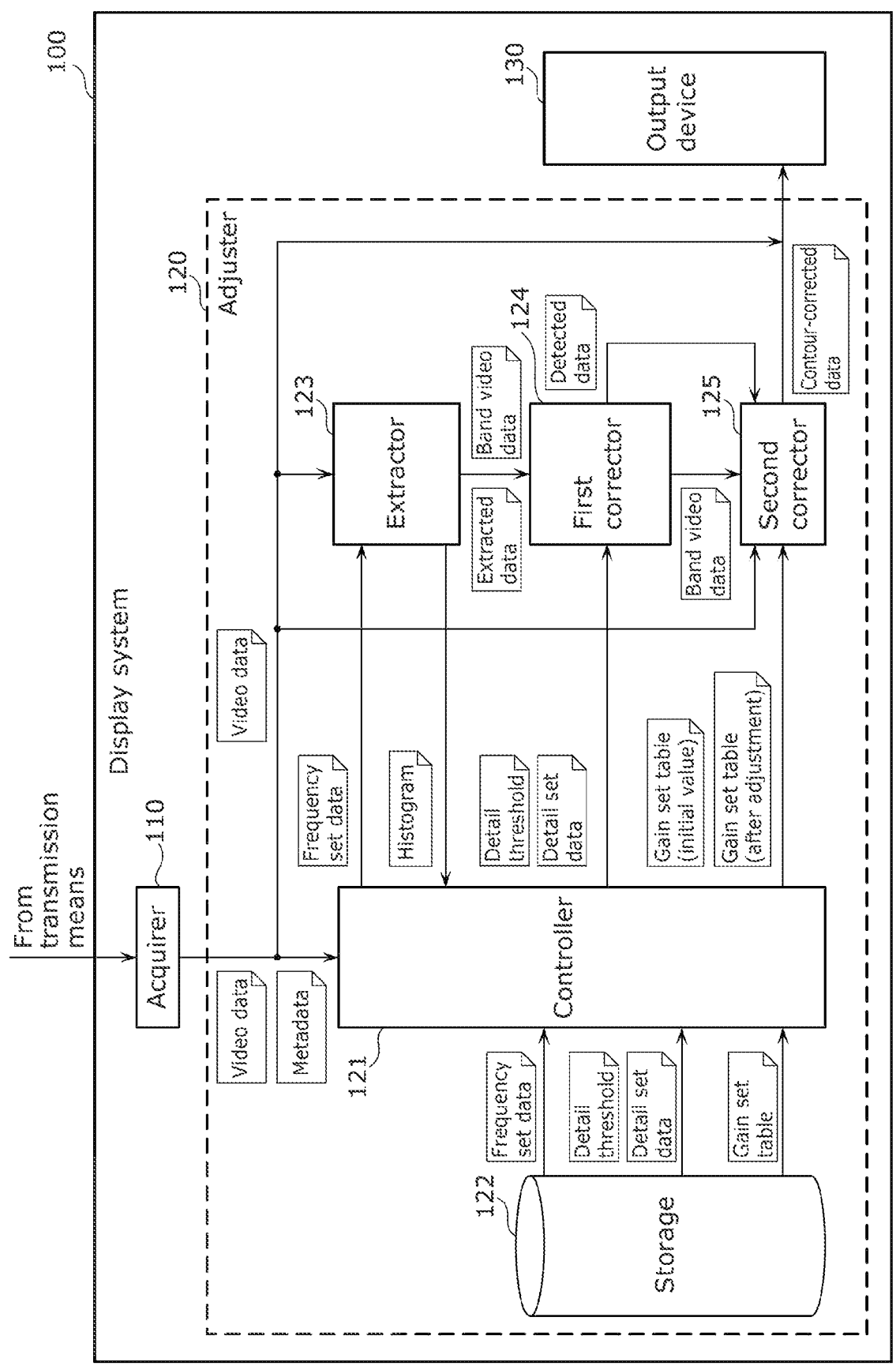
FIG. 6 is a block diagram showing one example of a functional configuration of the display system according to the embodiment.

FIG. 6 is a block diagram showing one example of the functional configuration of the display system according to the present embodiment.

As illustrated in FIG. 6, display system 100 includes, as the functional configuration, acquirer 110, adjuster 120, and output device 130.

Acquirer 110 acquires distribution data via the transmission means. Acquirer 110 then decodes the distribution data to acquire video data. Acquirer 110 may be realized by, for example, components such as tuner 101 and decoder 102.

Adjuster 120 includes controller 121, storage 122, extractor 123, first corrector 124, and second corrector 125.

Controller 121 specifies effective frequency bands, using MAX CHF, MAX CVF, MIN CHF, and MIN CVF, which are the metadata included in the video data, and analyzes videos in the specified effective frequency bands. Controller 121 then adaptively generates frequency set data in accordance with the video data, the frequency set data being data for use in frequency division of videos in effective frequency bands. Controller 121 reads an initial value for the frequency set data stored in storage 122 from storage 122 and generates frequency set data from the read initial value for the frequency set data, the metadata included in the video data, and the videos in the effective frequency bands. Controller 121 adaptively determines frequency threshold values HF1 and VF1 that designate lowest ones of the effective frequency bands and frequency threshold values HF4 and HF4 that designate highest ones of the effective frequency bands. Threshold value HF1 designates a minimum frequency in the effective frequency bands in the horizontal direction. Threshold value VF1 designates a minimum frequency in the effective frequency bands in the vertical direction. Threshold value HF4 designates a maximum frequency in the effective frequency bands in the horizontal direction. Threshold value VF4 designates a maximum frequency in the effective frequency bands in the vertical direction. Threshold values HF1 and VF1, HF4, VF4 correspond respectively to MAX CHF, MAX CVF, MIN CHF, and MIN CVF (see FIG. 8).

Controller 121 also generates a detail threshold and detail set data. The detail threshold refers to a threshold value used to determine whether each area (e.g., each pixel) of the video is any of a plain region, a detail region, and an edge region. The detail set data refers to data that indicates an offset value for a sharpness gain applied to each region (pixel) determined as the plain region, an offset value for a sharpness gain applied to each region (pixel) determined as the detail region, and an offset value for a sharpness gain applied to each region (pixel) determined as the edge region. Note that the plain region, the detail region, and the edge region indicate categories depending on a maximum difference in amplitude between pixel values for the region (pixel) and indicate that the detail region has a higher maximum difference in amplitude between pixel values than the plain region, and the edge region has a higher maximum difference in amplitude between pixels values than the detail region. Controller 121 may read an initial value for the detail threshold and an initial value for the detail set data, which are stored in storage 122, from storage 122 and use the read intimal value for the detail threshold and the read initial value for the detail set data in a histogram that indicates the number of pixels in each frequency band of the video among the effective frequency bands so as to generate a detail threshold and detail set data that correspond to the histogram.

Controller 121 also generates a set table for setting a sharpness gain to be used in the contour correction processing, using MAX CHF, MAX CVF, MIN CHF, and MIN CVF and a histogram that indicates the number of pixels in each frequency band of the video among the effective frequency bands. Controller 121 may read an initial value for the set table stored in storage 122, from storage 122, and use the read initial value for the set table, the frequency information, and the histogram to generate a set table that corresponds to the frequency information and the histogram.

The contour correction processing as used herein refers to processing that is performed on the video data in order to improve the resolution or definition of the video. Thus, performing the contour correction processing on the video data improves the resolution or definition of the video indicated by the obtained video data. The sharpness gain refers to a parameter that defines gains in the contour correction processing. Note that the result of performing the contour correcting processing with a sharpness gain of zero becomes the same as the result obtained when the contour correction processing is not performed. In this case, the resolution or definition of the video remains unchanged before and after the contour correction processing.

Note that controller 121 is realized by control circuit 103. Specifically, controller 121 is realized by control circuit 103 executing a predetermined program stored in memory 104.

Storage 122 stores initial values for the frequency set data, the detail threshold, the detail set data, and the gain set table. Storage 122 is realized by memory 104.

Extractor 123 extracts a plurality of ranges by dividing the video indicated by the video data into a plurality of horizontal frequency bands and a plurality of vertical frequency bands. The details of extractor 123 will be described with reference to FIGS. 7 to 13.

Figure 7:
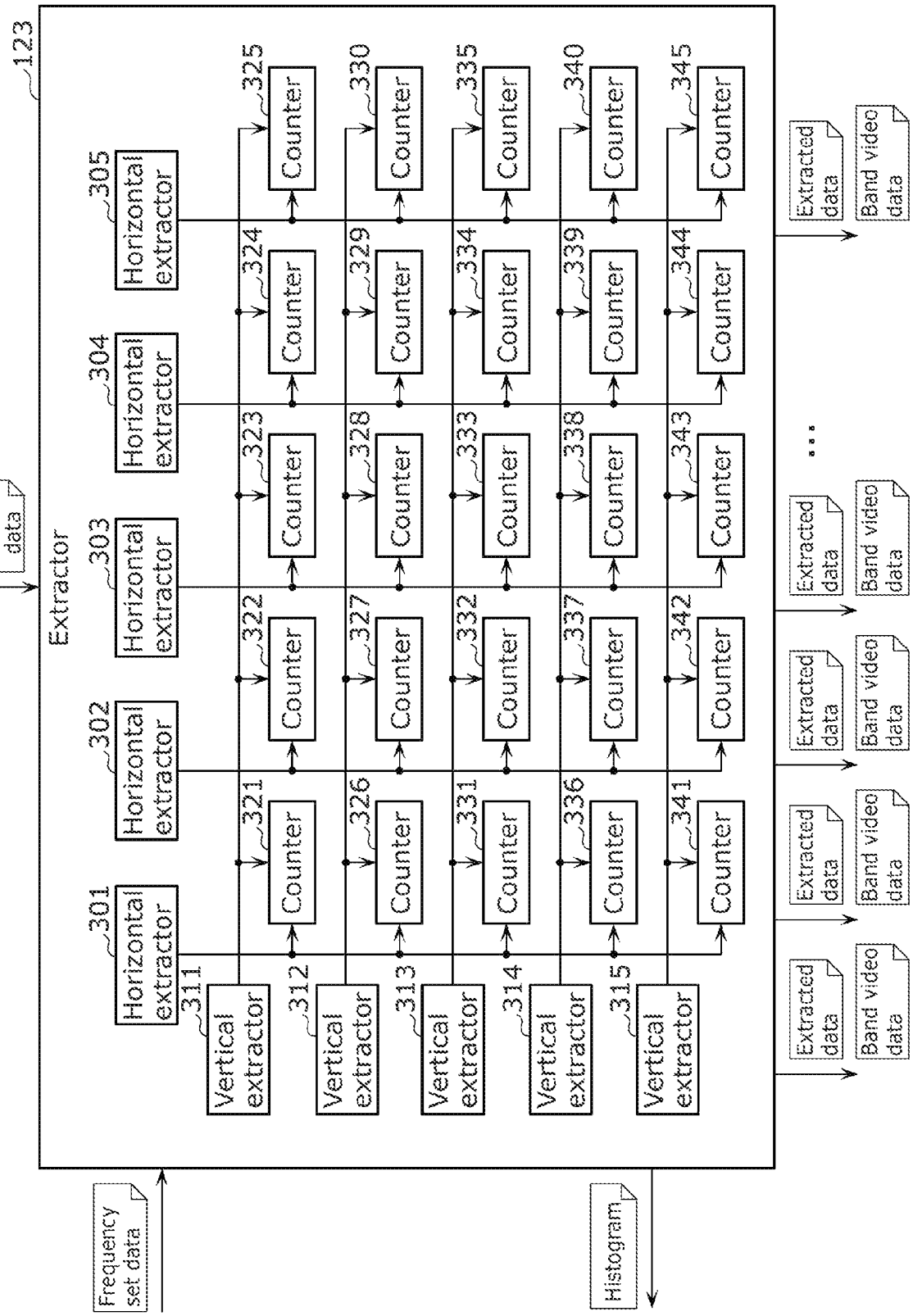
FIG. 7 is a block diagram showing one example of a detailed configuration of an extractor.
Figure 8:
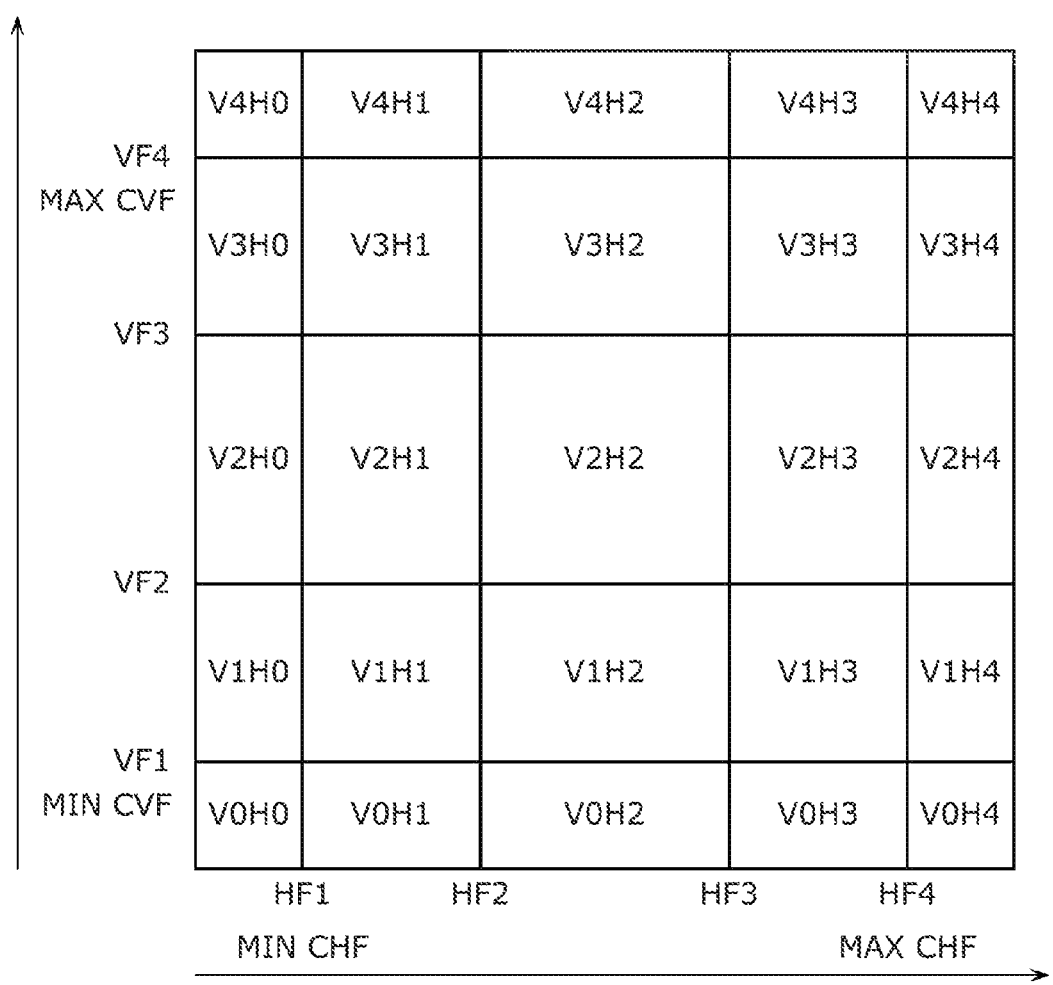
FIG. 8 is a diagram for describing a plurality of regions obtained by frequency division.
Figure 9:
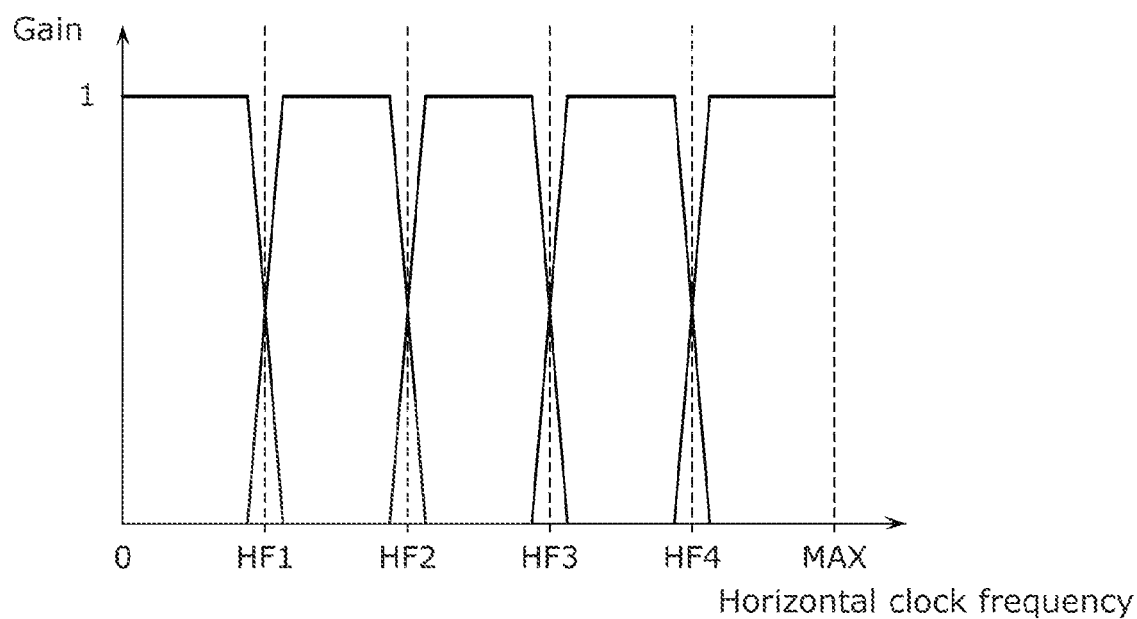
FIG. 9 is a diagram for defining a plurality of regions that divide a horizontal frequency band.
Figure 10:
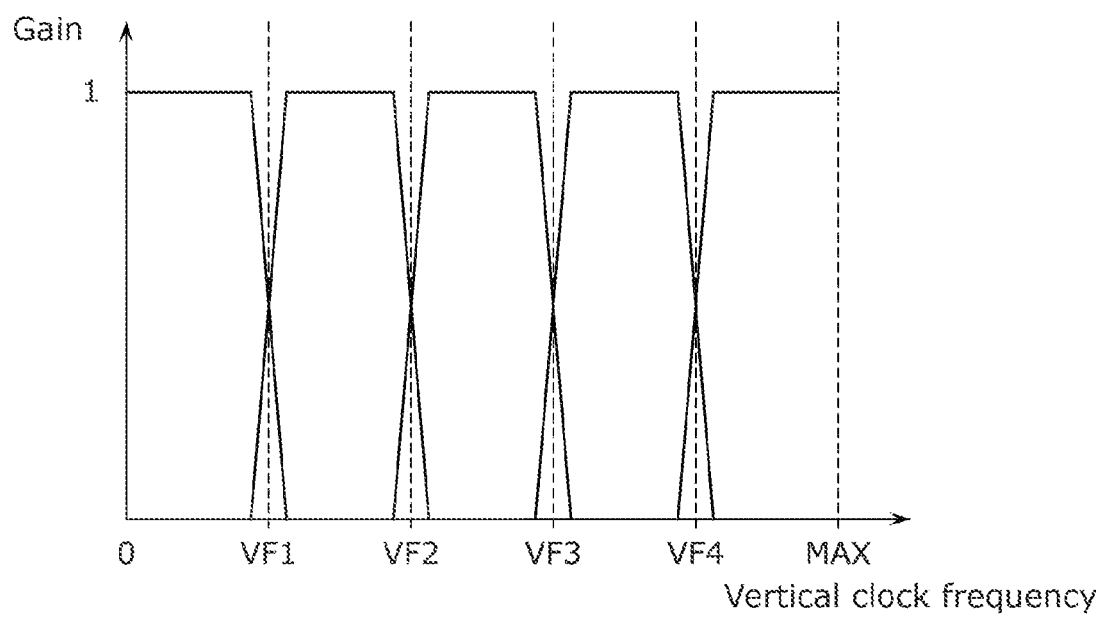
FIG. 10 is a diagram for defining a plurality of regions that divide a vertical frequency band.
Figure 11:
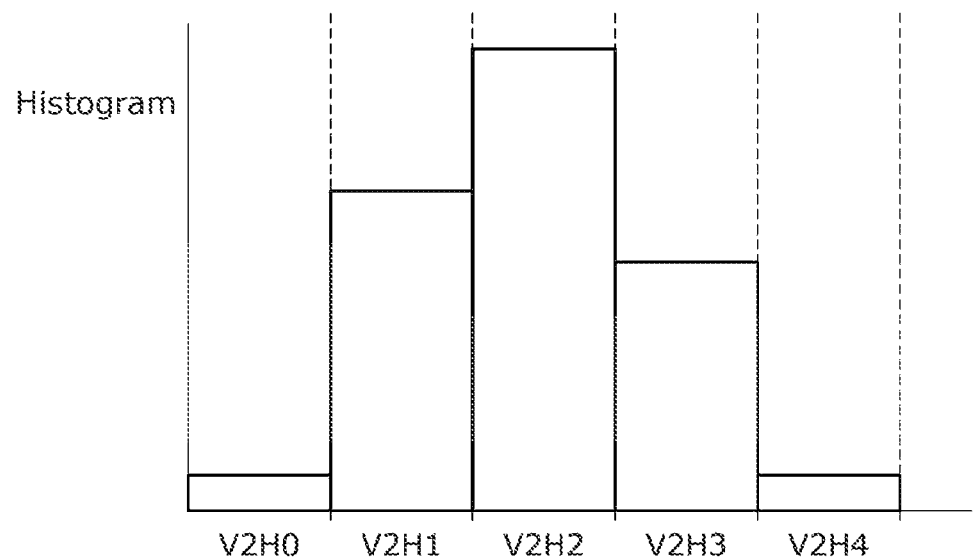
FIG. 11 is a histogram showing the number of pixels that belong to each region in a row of vertical regions V2.
Figure 12:
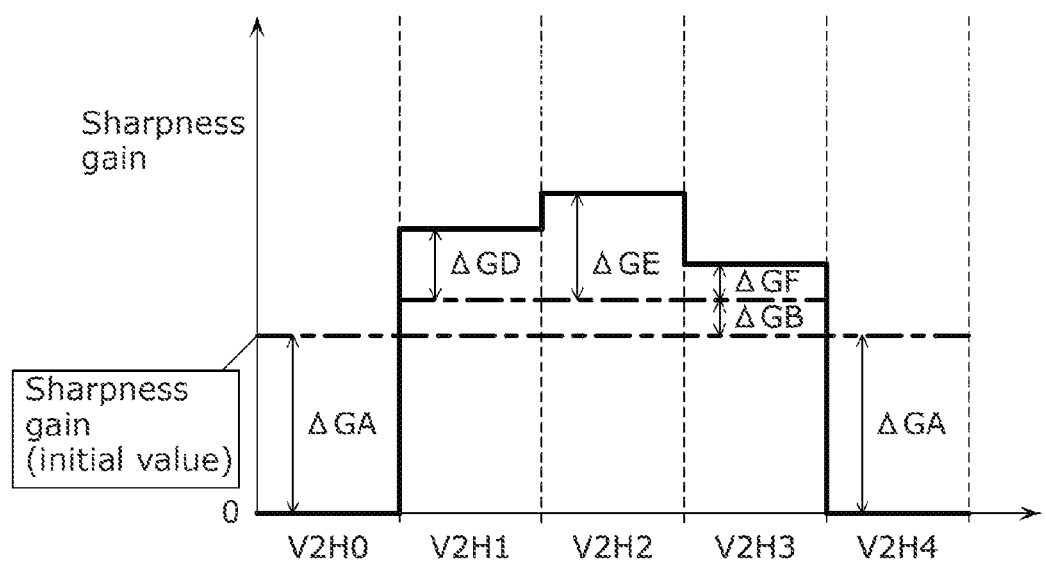
FIG. 12 is a graph showing a first offset curve of the sharpness gain for each region in the row of vertical regions V2.

FIG. 7 is a block diagram showing one example of a detailed configuration of the extractor. FIG. 8 is an explanatory diagram for describing a plurality of ranges obtained by frequency division. FIG. 9 is a diagram for defining a plurality of ranges that divide a horizontal frequency band. FIG. 10 is a diagram for defining a plurality of ranges that divide a vertical frequency band. FIG. 11 is a histogram showing the number of pixels that belong to each range in the row of vertical ranges V2. FIG. 12 is a graph showing a first offset curve of the sharpness gain for each range in the row of vertical ranges V2. FIG. 13 illustrates a table showing an offset value for the sharpness gain for each range.

As illustrated in FIG. 7, extractor 123 includes five horizontal extractors 301 to 305, five vertical extractors 311 to 315, and 25 counters 321 to 345.

As illustrated in FIG. 8, five horizontal extractors 301 to 305 each perform filtering using threshold values HF1, HF2, HF3, and HF4 in the horizontal frequency bands indicated by the frequency set data to extract five ranges that divide the video in the horizontal direction. Specifically, horizontal extractor 301 extracts horizontal range H0 less than threshold value HF1 from the frequency bands. Horizontal extractor 302 extracts horizontal range H1 of the frequency band greater than threshold value HF1 and less than threshold value HF2. Horizontal extractor 303 extracts horizontal range H2 of the frequency band greater than threshold value HF2 and less than threshold value HF3. Horizontal extractor 304 extracts horizontal range H3 of the frequency band greater than threshold value HF3 and less than threshold value HF4. Horizontal extractor 305 extracts horizontal range H4 of the frequency band greater than threshold value HF4.

Note that threshold value HF1 may be included in either of horizontal range H0 and horizontal range H1. Threshold value HF2 may be included in either of horizontal range H1 and horizontal range H2. Threshold value HF3 may be included in either of horizontal range H2 and horizontal range H3. Threshold value HF4 may be included in either of horizontal range H3 and horizontal range H4.

Note that, as illustrated in FIG. 9, five horizontal extractors 301 to 305 may define the range around each of threshold values HF1, HF2, HF3, and HF4, respectively, by weighing two ranges divided at each of threshold values HF1, HF2, HF3, and HF4. That is, the range around threshold value HF1 (i.e., a first band range with threshold value HF1 as the center) may be defined such that horizontal range H1 is weighed more with increasing frequencies. This means that, for example in the case of a pixel with a frequency at threshold value HF1, a half of the pixel belongs to horizontal range H0 and the other half of the pixel belongs to horizontal range H1 because threshold value HF1 in FIG. 9 has a gain of 0.5 for horizontal range H0 and a gain of 0.5 for horizontal range H1. In other words, in the case where the frequency of a pixel belongs to a range around a threshold value that is between first and second horizontal ranges, a portion of the pixel that is indicated by a gain value for the first horizontal range corresponding to the pixel belongs to the first horizontal range, and the other portion of the pixel that is indicated by a gain value for the second horizontal range corresponding to the pixel belongs to the second horizontal range.

As illustrated in FIG. 8, five vertical extractors 311 to 315 perform filtering on each of horizontal ranges H0 to H4 extracted by horizontal extractors 301 to 305, using threshold values VF1, VF2, VF3, and VF4 for the vertical frequency bands indicated by the frequency set data. Through the filtering, five vertical extractors 311 to 315 extract five ranges that divide each of horizontal ranges H0 to H4 extracted by horizontal extractors 301 to 305 in the vertical direction. Accordingly, the video is divided into 25 ranges including five ranges in each horizontal row and five ranges in each vertical column.

Specifically, vertical extractor 311 extracts vertical range V0 of the frequency band less than threshold value VF1. Vertical extractor 312 extracts vertical range V1 of the frequency band greater than threshold value VF1 and less than threshold value VF2. Vertical extractor 313 extracts vertical range V2 of the frequency band greater than threshold value VF2 and less than threshold value VF3. Vertical extractor 314 extracts vertical range V3 of the frequency band greater than threshold value VF3 and less than threshold value VF4. Vertical extractor 315 extracts vertical range V4 of the frequency band greater than threshold value VF4.

Note that threshold value VF1 may be included in either of vertical range V0 and vertical range V1. Threshold value VF2 may be included in either of vertical range V1 and vertical range V2. Threshold value VF3 may be included in either of vertical range V2 and vertical range V3. Threshold value VF4 may be included in either of vertical range V3 and vertical range V4.

Note that, as illustrated in FIG. 10, five vertical extractors 311 to 315 may define the range around each of threshold values VF1, VF2, VF3, and VF4, respectively, by weighing two ranges divided at each of threshold values VF1, VF2, VF3, and VF4. That is, the range around threshold value VF1 (i.e., a first band range with threshold value VF1 as the center) may be defined such that vertical range V1 is weighted more with increasing frequencies. This indicates that, for example in the case of a pixel with a frequency at threshold value VF1, a half of the pixel belongs to vertical range V0 and the other half of the pixel belongs to vertical range V1 because threshold value VF1 in FIG. 10 has a gain of 0.5 for vertical range V0 and a gain of 0.5 for vertical range V1. In other words, in the case where the frequency of a pixel belongs to a range around a threshold value that is between first and second vertical ranges, a portion of the pixel that is indicated by a gain value for the first vertical range corresponding to the pixel belongs to the first vertical range, and the other portion of the pixel that is indicated by a gain value for the second vertical range corresponding to the pixel belongs to the second vertical range.

Note that a difference between any two adjacent ones of threshold values HF1, HF2, HF3, and HF4 does not necessarily have to be at a constant value. That is, horizontal ranges H0 to H4 do not necessarily have to have the same bandwidth. For example, horizontal ranges H0 and H4 may have smaller bandwidths than other horizontal ranges H1 to H3. Similarly, a difference between any two adjacent ones of threshold values VF1, VF2, VF3, and VF4 does not necessarily have to be at a constant value. That is, vertical ranges V0 to V4 do not necessarily have to have the same bandwidth. For example, vertical ranges V0 and V4 may have smaller bandwidths than other vertical ranges V1 to V3.

As illustrated in FIG. 8, 25 counters 321 to 345 respectively count the numbers of pixels that belong respectively to 25 ranges V0H0 to V4H4 defined by horizontal ranges H0 to H4 that divide the video in the horizontal direction and vertical ranges V0 to V4 that divide the video in the vertical direction. That is, five counters 321 to 325 respectively count the number of pixels that belong to range V0H0 defined by vertical range V0 and horizontal range H0, the number of pixels that belong to range V0H1 defined by vertical range V0 and horizontal range H1, the number of pixels that belong to range V0H2 defined by vertical range V0 and horizontal range H2, the number of pixels that belong to range V0H3 defined by vertical range V0 and horizontal range H3, and the number of pixels that belong to range V0H4 defined by vertical range V0 and horizontal range H4. Five counters 326 to 330 respectively count the number of pixels that belong to range V1H0 defined by vertical range V1 and horizontal range H0, the number of pixels that belong to range V1H1 defined by vertical range V1 and horizontal range H1, the number of pixels that belong to range V1H2 defined by vertical range V1 and horizontal range H2, the number of pixels that belong to range V1H3 defined by vertical range V1 and horizontal range H3, and the number of pixels that belong to range V1H4 defined by vertical range V1 and horizontal range H4. Five counters 331 to 335 respectively count the number of pixels that belong to range V2H0 defined by vertical range V2 and horizontal range H0, the number of pixels that belong to range V2H1 defined by vertical range V2 and horizontal range H1, the number of pixels that belong to range V2H2 defined by vertical range V2 and horizontal range H2, the number of pixels that belong to range V2H3 defined by vertical range V2 and horizontal range H3, and the number of pixels that belong to range V2H4 defined by vertical range V2 and horizontal range H4. Five counters 336 to 340 respectively count the number of pixels that belong to range V3H0 defined by vertical range V3 and horizontal range H0, the number of pixels that belong to range V3H1 defined by vertical range V3 and horizontal range H1, the number of pixels that belong to range V3H2 defined by vertical range V3 and horizontal range H2, the number of pixels that belong to range V3H3 defined by vertical range V3 and horizontal range H3, and the number of pixels that belong to range V3H4 defined by vertical range V3 and horizontal range H4. Five counters 341 to 345 respectively count the number of pixels that belong to range V4H0 defined by vertical range V4 and horizontal range H0, the number of pixels that belong to range V4H1 defined by vertical range V4 and horizontal range H1, the number of pixels that belong to range V4H2 defined by vertical range V4 and horizontal range H2, the number of pixels that belong to range V4H3 defined by vertical range V4 and horizontal range H3, and the number of pixels that belong to range V4H4 defined by vertical range V4 and horizontal range H4.

Each of 25 counters 321 to 345 obtains extracted data that corresponds to one of 25 counting results, by counting the number of pixels that belong to the corresponding range. Note that, for example, the extracted data may include, for each of the 25 ranges, range information for specifying the range and the number of pixels that belong to the range. The generated 25 pieces of extracted data are output to first corrector 124. Alternatively, extractor 123 may output range video data to first corrector 124 for each of the 25 ranges, the range video data indicating the range information for specifying the range and pixel information indicating one or more pixels that belong to the range.

Extractor 123 generates a histogram that indicates the number of pixels belonging to each range, using the 25 pieces of extracted data. For example, extractor 123 may generate a histogram as illustrated in FIG. 11 as a result of counting the number of pixels that belong to each of a plurality of ranges in the row of vertical ranges V2. Although FIG. 11 shows, by way of example, the number of pixels that belong to each of the plurality of ranges in the row of vertical ranges V2, the histogram generated by extractor 123 shows the result of counting the number of pixels that belong to each of the 25 ranges. The generated histogram is output to controller 121. Note that extractor 123 is realized by control circuit 103. Specifically, extractor 123 is realized by control circuit 103 executing a predetermined program stored in memory 104.

Controller 121 makes sharpness gain adjustment to the video such that, among a plurality of regions of the video, a sharpness gain for a first region that belongs to effective frequency bands indicated by the metadata exceeds a sharpness gain for a second region that belongs to ineffective frequency bands other than the effective frequency bands. The plurality of regions may, for example, be a plurality of pixels, or may be a plurality of blocks. Specifically, controller 121 makes sharpness gain adjustment to the video by adding a first offset value that is a value less than or equal to a first threshold value to the sharpness gain for the ineffective frequency bands of the video. Controller 121 also makes sharpness gain adjustment to the video by adding a second offset value that is a value greater than the first threshold value to the sharpness gains for the effective frequency bands of the video. Note that the first threshold value may, for example, be zero. That is, the first offset value used to adjust the sharpness gain for the second region that belongs to the ineffective frequency bands is a value less than or equal to zero. The second offset value used to adjust the sharpness gain for the first region that belongs to the effective frequency bands is a value greater than zero.

For example, in FIG. 13, the frequency bands of ranges V0H0-V4H0, V0H1, V4H1, V0H2, V4H2, V0H3, V4H3, and V0H4-V4H4 that are ineffective frequency bands of the video data on contents set by distribution system 200 are frequency bands in which the video generated by distribution system 200 is not present. Thus, controller 121 calculates a first offset value that makes zero the sharpness gains for a plurality of ranges that belong to the ineffective frequency bands, using the initial value for sharpness gains in the gain set table as a reference. The first offset value may, for example, be a negative number that is equal to the absolute value for the initial value in the gain set table. For example, in FIG. 12, the frequency bands of ranges V2H0 and V2H4 are ineffective frequency bands generated by distribution system 200. Thus, controller 121 determines negative first offset value ΔGA in order to adjust the sharpness gains for the frequency bands of ranges V2H0 and V2H4 at zero, using the initial value for sharpness gains for the frequency bands of ranges V2H0 and V2H4 as a reference. Note that, as illustrated in FIG. 12, the initial value for sharpness gains is set to a positive value, irrespective of the frequency band. Thus, adjuster 120 will not raise the sharpness gains for the ranges of video that belong to the ineffective frequency bands of the actual contents to be distributed. This suppresses the amplification of sharpness gains for noise in high-frequency ranges caused on the transmission line between the distribution side and the reception side due to the execution of processing for achieving sharpness gains.

Note that although controller 121 sets the first offset value to a negative number equal to the absolute value for the initial value in the gain set table, the present disclosure is not limited to this example, and the first offset value may be a negative number that is greater than the absolute value for the initial value in the gain set table. In this case, it is possible to set the sharpness gains for pixels in the ineffective frequency bands to a negative value and accordingly to give a noise reduction effect to the pixels in the ineffective frequency bands.

In FIG. 12, ranges V2H1, V2H2, and V2H3 are effective frequency bands generated by distribution system 200. Thus, controller 121 determines positive second offset value ΔGB in order to adjust the sharpness gains for the frequency bands of ranges V2H1, V2H2, and V2H3 at a value greater than the initial value.

Controller 121 may further use the histogram acquired from extractor 123 and determine a plurality of third offset values such that a greater value is assigned to a range in which a greater number of pixels is counted among a plurality of ranges of the frequency domain. Note that the third offset values may include the second offset value. For example, as illustrated in FIG. 12, controller 121 determines largest offset value ΔGE for range V2H3 that has a largest number of pixels among ranges V2H1 to V2H3 belonging to the effective frequency bands among the plurality of ranges V2H0 to V2H4 in the row of vertical range V2. Controller 121 determines second largest offset value ΔGD for range V2H1 that has a second largest number of pixels. Controller 121 also determines third largest offset value ΔGF for range V2H3 that has a third largest number of pixels.

For example, in FIG. 13, the frequency bands of ranges V1H1-V3H1, V1H2-V3H2, and V1H3-V3H3 that are effective frequency bands of the video data on contents set by distribution system 200 are frequency bands in which the video generated by distribution system 200 is present. Thus, in order to improve the resolution or definition of the video in the effective frequency bands, controller 121 calculates a second offset value that amplifies sharpness gains, using the initial value for sharpness gains in the gain set table as a reference. The second offset value may, for example, be a positive number. Controller 121 also calculates, on the basis of the histogram, third offset values such that a greater positive offset value (A to I) is assigned to a range for which a greater numbers of belonging pixels is counted. This allows adjuster 120 to raise the sharpness gains for the frequency bands of the video data that have larger numbers of pixels in the video and thereby to improve apparent resolution or definition.

Note that controller 121 generates an adjusted gain set table that includes the first offset value and the second offset value for each of the plurality of frequency bands, and outputs the generated and adjusted gain set table to second corrector 125.

Figure 14:
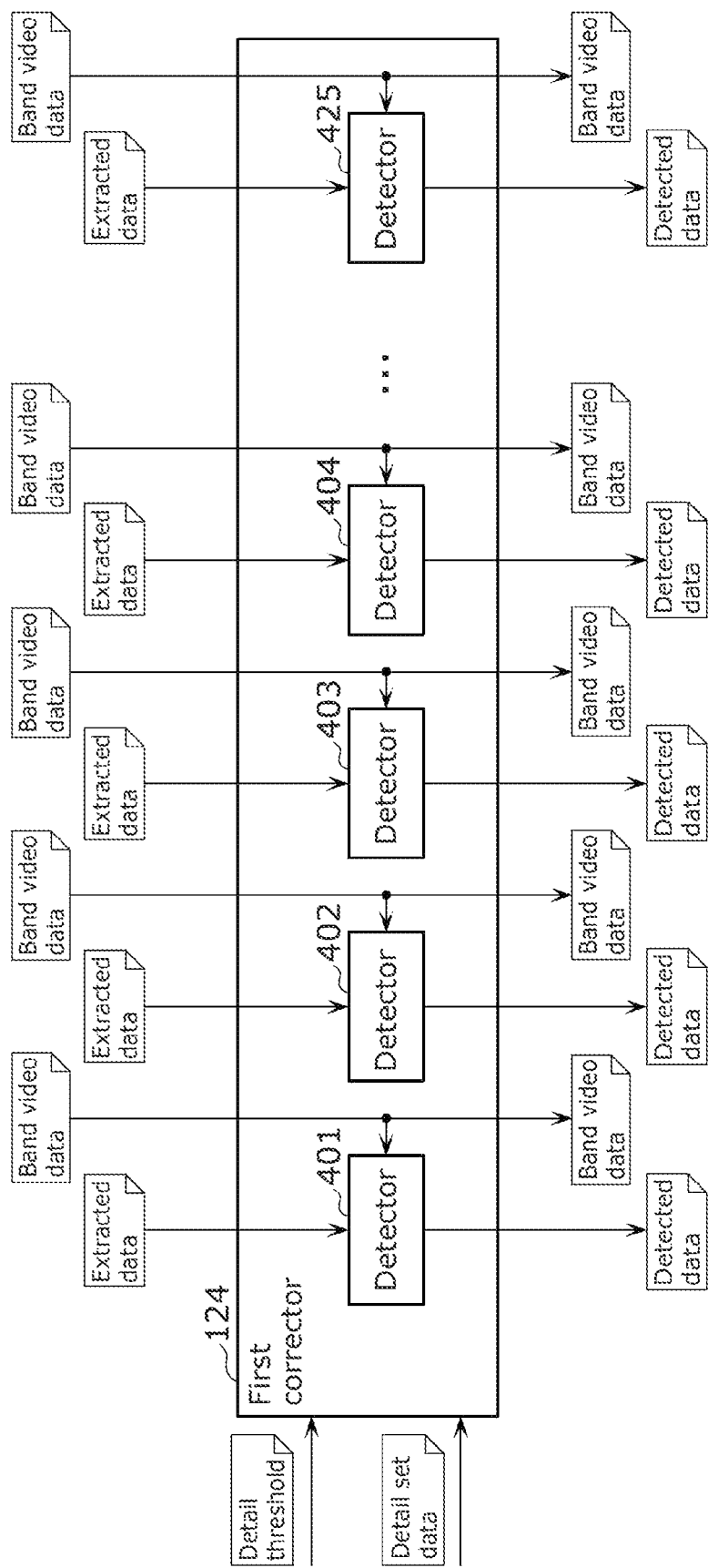
FIG. 14 is a block diagram showing one example of a detailed configuration of a first corrector.
Figure 15:
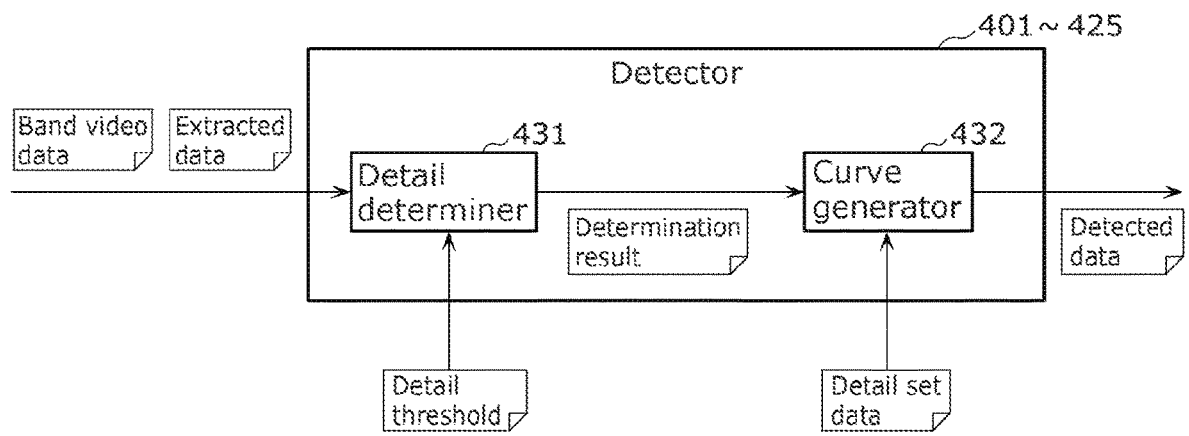
FIG. 15 is a block diagram showing one example of a detailed configuration of a detector.
Figure 16:
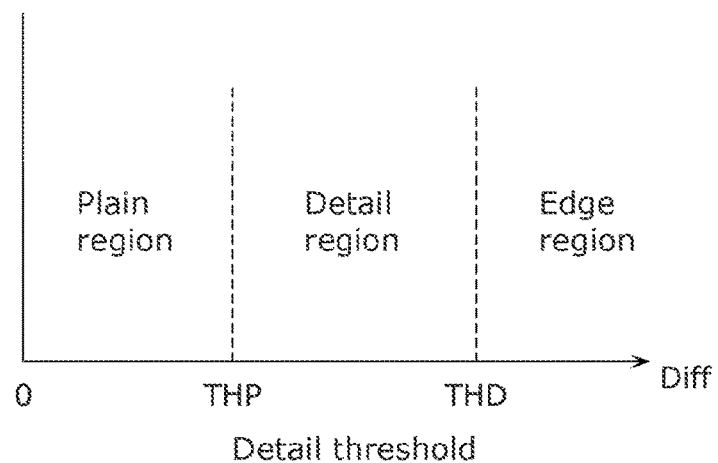
FIG. 16 illustrates a detail threshold for determining the type of each region in video.
Figure 17:
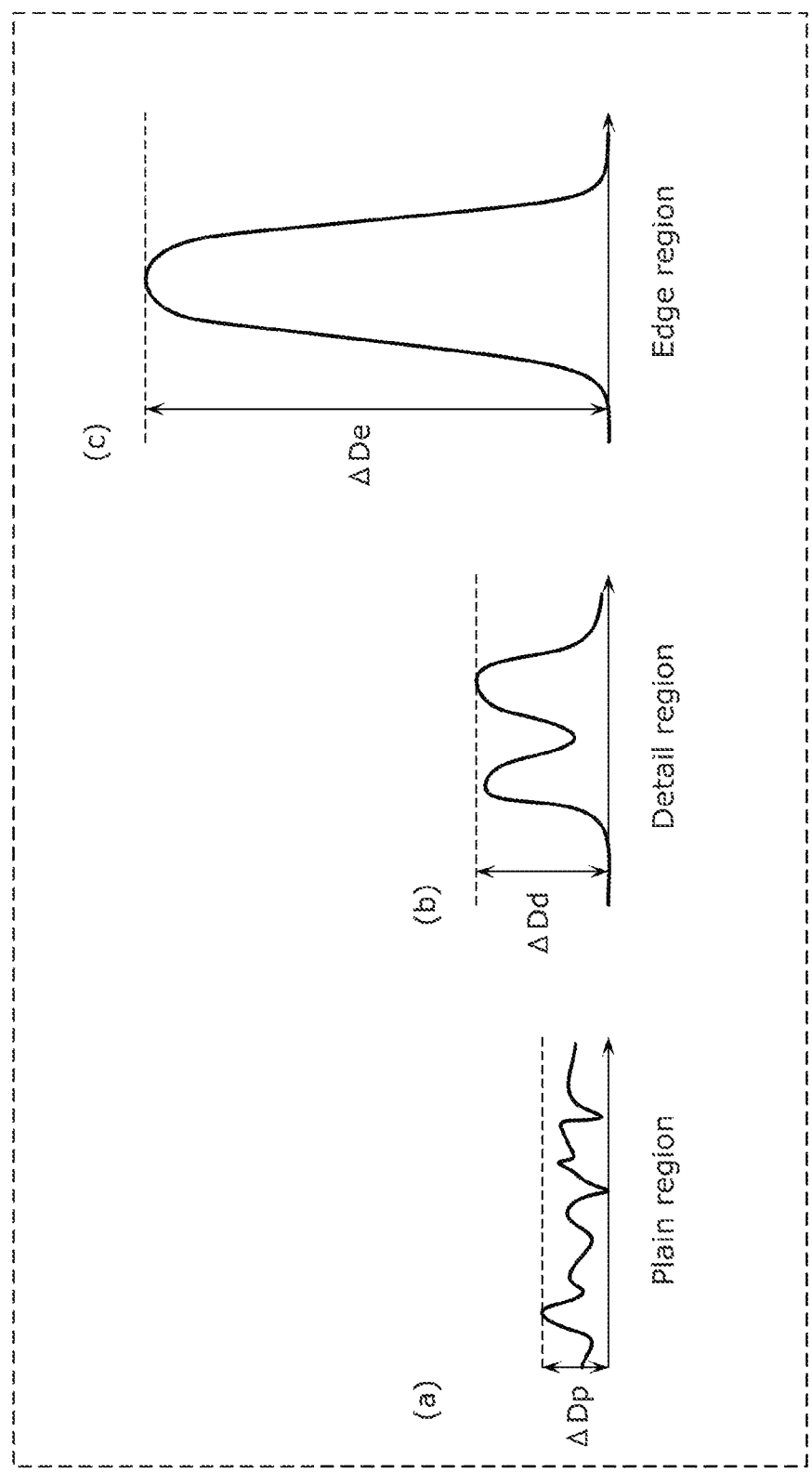
FIG. 17 shows one example of the result of determining the type of each region.
Figures 18, 19:
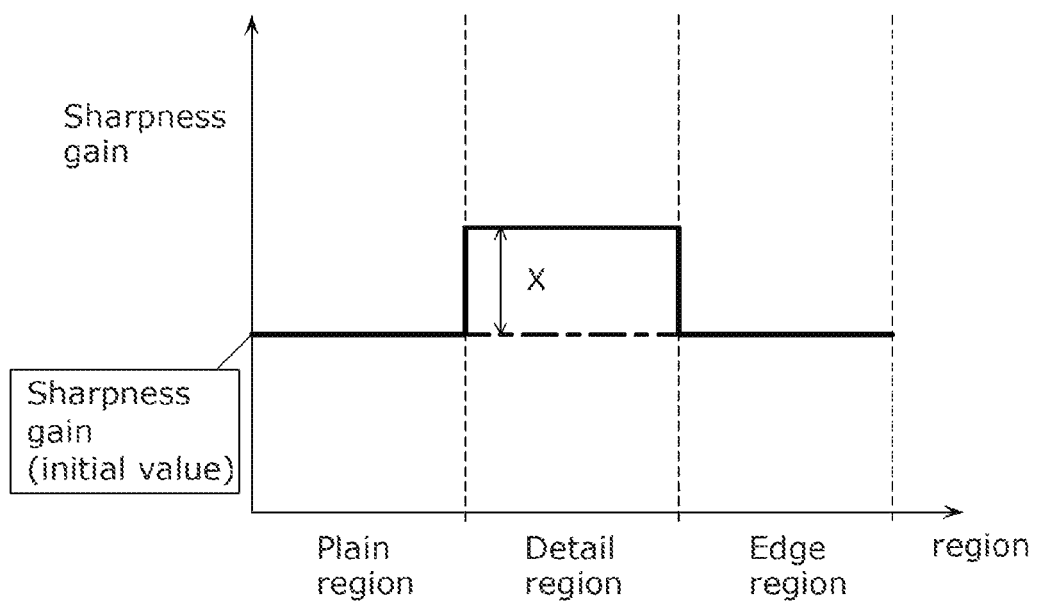
FIG. 18 is a graph showing a second offset curve.
FIG. 19 illustrates a table showing one example of detail set data.

Next, first corrector 124 will be described with reference to FIGS. 14 to 19. FIG. 14 is a block diagram showing one example of a detailed configuration of the first corrector. FIG. 15 is a block diagram showing one example of a detailed configuration of one detector. FIG. 16 illustrates the detail threshold used to determine the type of each region of video. FIG. 17 shows one example of the result of determining the type of each region. FIG. 18 is a graph showing a second offset curve. FIG. 19 illustrates a table showing one example of the detail set data.

As illustrated in FIG. 14, first corrector 124 includes 25 detectors 401 to 425 that correspond respectively to 25 ranges V0H0 to V4H4 and each detect the type of region to which pixels included in the corresponding range belong. Each of 25 detectors 401 to 425 includes detail determiner 431 and curve generator 432 as illustrated in FIG. 15.

Detail determiner 431 determines, on the basis of the amplitude and the range video data that is input to the corresponding detector, whether each pixel indicated by the range video data is any of the plain region, the detail region, and the edge region. Specifically, the amplitude is the value based on the pixel values of pixels. For example, the amplitude may correspond to luminance Y when the video data is expressed by YUV signals, and correspond to MaxRGB when the video data is expressed by RBG signals, MaxRGB indicating a maximum value among R, G, B components of the pixel values of pixels included in the video data. Specifically, detail determiner 431 calculates a maximum difference on the basis of the pixel values of a plurality of pixels within a predetermined width in the horizontal or vertical direction with a pixel to be processed in the range video data as a reference (center). The predetermined width as used herein may, for example, be a predetermined number of clocks' worth of width in the horizontal or vertical direction. The maximum difference as used herein refers to a difference between maximum and minimum values among the pixel values of a plurality of pixels included within the predetermined width.

Using the range video data, the extracted data, and the detail threshold, detail determiner 431 makes sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range. The predetermined range as used herein refers to a range that is determined to be the detail region as illustrated in FIG. 16 and refers to, for example, a range greater than threshold value THP and less than threshold value THD. The fourth offset value may, for example, be +X that is a value greater than zero as indicated by the detail set data in FIG. 19. The fifth offset value may, for example, be ±0 as indicated by the detail set data in FIG. 19.

If maximum difference ΔDp in amplitude based on the pixel value of a pixel to be processed is less than threshold value THP as illustrated in FIG. 16 and (a) in FIG. 17, detail determiner 431 determines the type of region to which the pixel belongs as the plain region. If maximum difference ΔDd in amplitude based on the pixel value of a pixel to be processed is greater than threshold value THP and less than threshold value THD as illustrated in FIG. 16 and (b) in FIG. 17, detail determiner 431 determines the type of region to which the pixel belongs as the detail region. If maximum difference ΔDe in amplitude based on the pixel value of a pixel to be processed is greater than threshold value THD as illustrated in FIG. 16 and (c) in FIG. 17, detail determiner 431 determines the type of region to which the pixel belongs as the edge region. Note that, for the pixel with a maximum difference at threshold value THD, the type of region may be determined as either of the plain region and the detail region. For a pixel with a maximum difference at threshold value THP, the type of region may be determined as either of the detail region and the edge region. Detail determiner 431 outputs the result of the determination to curve generator 432.

Using the determination result and the detail set data, curve generator 432 generates an offset curve as illustrated in FIG. 18. Curve generator 432 acquires the detail set data from controller 121 and generates, on the basis of the acquired detail set data, an offset curve in which ±0 is set for the plain and edge regions, and +X is set for the detail region. Curve generator 432 outputs, to second corrector 125, detection data that is used to further add the fourth offset value to the sharpness gain for the range video data determined as the detail region. This allows first corrector 124 to set larger sharpness gains to regions of pixels that are determined to be the detail region.

The detail region has a great influence on the apparent resolution of the video. Thus, the apparent resolution of the video can be effectively improved by further raising the sharpness gain for the detail region. Although in the present example, the offset value for the plain and edge regions is set to ±0, the offset value may be set to a positive value smaller than +X, instead of ±0.

Note that first corrector 124 is realized by control circuit 103. Specifically, first corrector 124 is realized by control circuit 103 executing a predetermined program stored in memory 104.

Figure 20:
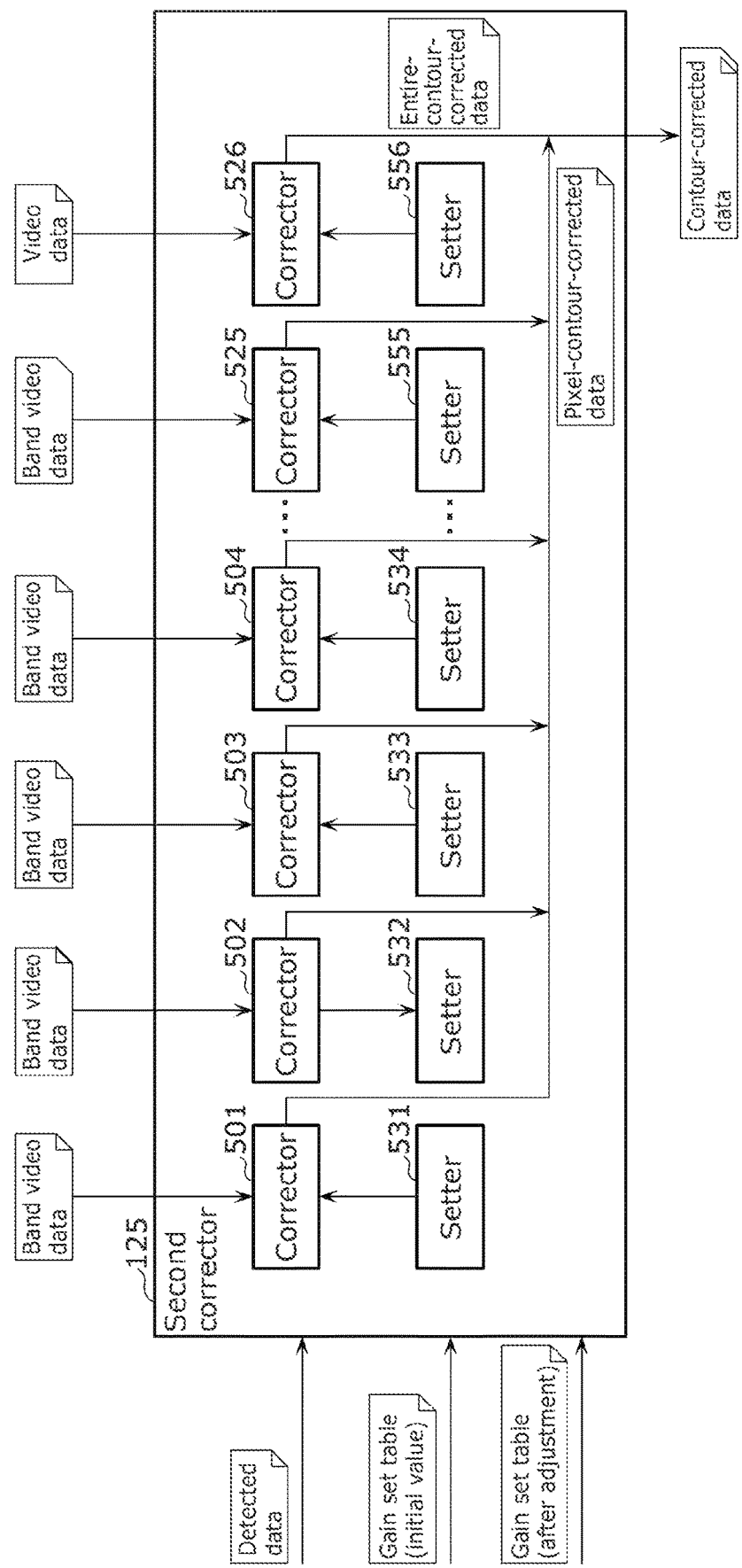
FIG. 20 is a block diagram showing one example of a detailed configuration of a second corrector.

Next, second corrector 125 will be described with reference to FIG. 20. FIG. 20 is a block diagram showing one example of a detailed configuration of the second corrector.

As illustrated in FIG. 20, second corrector 125 includes 26 correctors 501 to 526, and 26 setters 531 to 556.

Among 26 correctors 501 to 526, 25 correctors 501 to 525 correspond respectively to the 25 ranges. Corrector 526 corresponds to the video data.

Among 26 setters 531 to 556, 25 setters 531 to 555 correspond respectively to the 25 ranges. Setter 556 corresponds to the video data (i.e., video data indicating the entire video). Setter 556 receives the initial value in the gain set table from controller 121 and sets the initial value for sharpness gains to corrector 526. Corrector 526 generates and outputs entire-contour-corrected data on the basis of the initial value for sharpness gains.

Each of 25 setters 531 to 555 adds an offset value for the corresponding frequency band among the offset values set in the adjusted gain set table and an offset value indicated by the detection data for the corresponding frequency band for each pixel, calculates a sharpness gain based on the added offset value obtained by the addition, and sets the calculated sharpness gain for the corresponding one of correctors 501 to 525. On the basis of the set sharpness gain, each of correctors 501 to 525 generates and outputs pixel-contour-corrected data that is used in the contour correction processing. The pixel-contour-corrected data may be generated by, for example, differentiation processing using a target pixel and pixels before and after the target pixel. In the case where the sharpness gain is further raised, the pixel-contour-corrected data is more amplified before output.

Then, second corrector 125 adds the pixel-contour-corrected data generated by each of correctors 501 to 525 and the entire-contour-corrected data generated by corrector 526 to generate contour-corrected data that is used to properly adjust sharpness gains for each frequency band and for each type of region. Second corrector 125 outputs the generated contour-corrected data to output device 130.

Since second corrector 125 generates the adjusted contour-corrected data by properly adjusting sharpness gains for each frequency band and for each type of region belonging to the effective frequency bands of the contents to be distributed, it is possible for each frequency band to more effectively improve the sharpness gains for the regions of pixels that correspond to the detail region in the video data about frequency bands that include a large number of pixels. This more effectively improves the apparent resolution of the video.

In the ineffective frequency bands of the contents to be distributed, even if noise with amplitudes that are misdetected as the detail region intrudes on the transmission line, the offset value for sharpness gains for the ineffective frequency bands of the video data about the contents to be distributed can be set to zero or a negative number. Therefore, even if unnecessary noise components generated on the transmission line between distribution system 200 and display system 100 on the reception side are misdetected as the detail region that is effective at improving sharpness gains, it is possible to suppress the amplification of sharpness gains for such misdetected detail regions or to achieve noise reduction in such misdetected detail regions. This effectively improves image quality of the video to be displayed.

Note that second corrector 125 is realized by control circuit 103. Specifically, second corrector 125 is realized by control circuit 103 executing a predetermined program stored in memory 104.

Adjuster 120 ultimately adds the contour-corrected data output from second corrector 125 and the video data acquired from acquirer 110. That is, adjuster 120 adds the pixel-contour-corrected data, the entire-contour-corrected data, and the video data. In this way, adjuster 120 generates adjusted video data in which sharpness gains are properly adjusted for each frequency band and for each type of region.

As described above, each processing device of adjuster 120 may be realized by, for example, control circuit 103 and memory 104.

Output device 130 displays the output adjusted video data. Output device 130 may be realized by, for example, display device 105. Note that output device 130 is not limited to display device 105, and may serve as a transmission means for outputting adjusted video data to external equipment. For example, output device 130 may be a video output terminal that outputs adjusted video data to external equipment, or a communication IF that outputs adjusted video data to external equipment via wired or wireless communication. Note that the video output terminal may be a high-definition multimedia interface (HDMI) (registered trademark) terminal.

2. Operations

Next, operations of video system 1 will be described.

Figure 21:
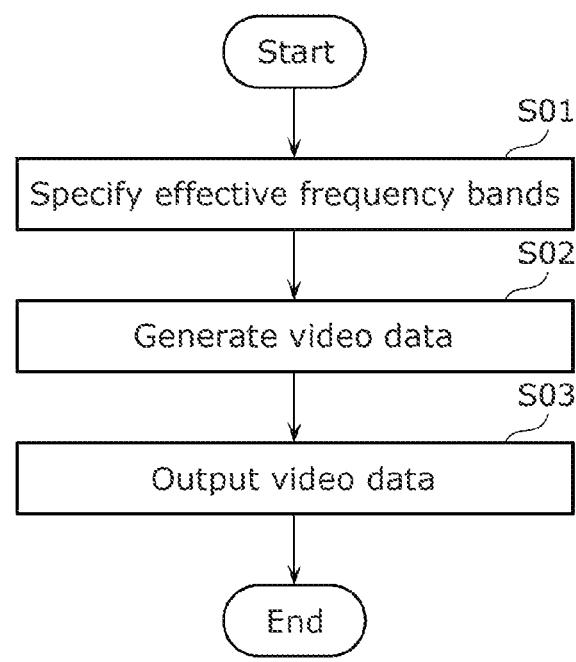
FIG. 21 is a flowchart of a video generation method performed by the distribution system.

First, operations of distribution system 200 will be described. FIG. 21 is a flowchart of a video generation method performed by the distribution system.

Distribution system 200 specifies effective frequency bands that are spatial frequency ranges of video (S01).

Then, distribution system 200 generates video data that includes the video and metadata indicating the specified effective frequency bands (S02). For example, distribution system 200 may generate encoded data for video by encoding the video data including the video and the metadata.

Then, distribution system 200 outputs the generated video data (S03). For example, distribution system 200 may output the video data by outputting the encoded data to the transmission line.

Figure 22:
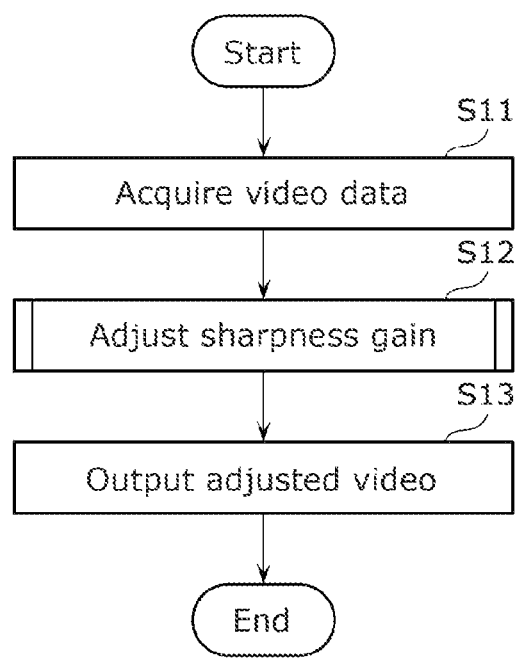
FIG. 22 is a flowchart of a video processing method performed by the display system.

Next, operations of display system 100 will be described. FIG. 22 is a flowchart of a video processing method performed by the display system.

Acquirer 110 of display system 100 acquires video data that includes video and metadata indicating effective frequency bands that are spatial frequency ranges in which the video is present (S11). For example, acquirer 110 of display system 100 may acquire the video data by acquiring encoded data and decoding the acquired encoded data.

Then, adjuster 120 of display system 100 makes sharpness gain adjustment to the video such that, among a plurality of regions of the video included in the acquired video data, the sharpness gain for a first region that belongs to the effective frequency ranges indicated by the metadata exceeds the sharpness gain for a second region that belongs to ineffective frequency bands that are outside the ranges of the effective frequency bands (S12). Details of step S12 will be described later with reference to FIG. 23.

Then, output device 130 of display system 100 outputs the adjusted video (S13).

Figure 23:
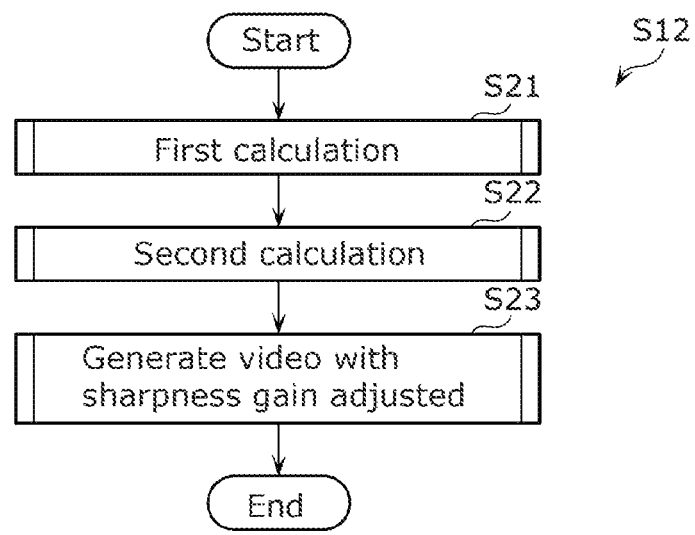
FIG. 23 is a flowchart of processing for making sharpness gain adjustment.

FIG. 23 is a flowchart of processing for making sharpness gain adjustment.

Adjuster 120 of display system 100 performs first calculation for calculating offset values (first and second offset values) that are used to adjust the sharpness gain for each of a plurality of frequency bands (S21). Details of step S21 will be described later with reference to FIG. 24.

For each of a plurality of pixels in the video, adjuster 120 performs second calculation for calculating offset values (fourth and fifth offset values) that are used to adjust the sharpness gain depending on the type of region to which the pixel belongs (S22). Details of step S22 will be described later with reference to FIG. 26.

Using the results of the first calculation and the second calculation, adjuster 120 generates video with sharpness gains adjusted (S23). Details of step S23 will be described later with reference to FIG. 27.

Figure 24:
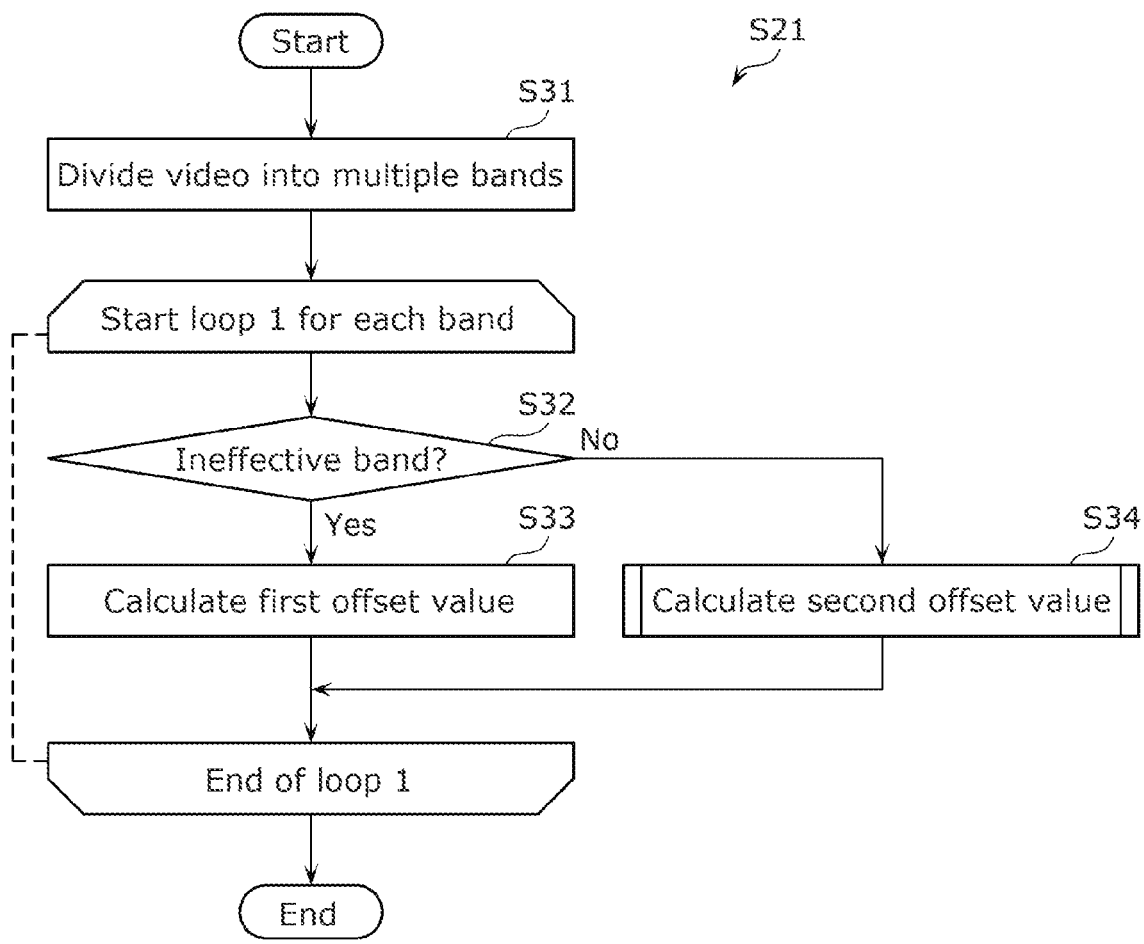
FIG. 24 is a flowchart of first calculation.

FIG. 24 is a flowchart of the first calculation.

Adjuster 120 divides the video into a plurality of ranges sectioned by a plurality of frequency bands in each of the horizontal and vertical frequency bands (S31).

Adjuster 120 starts loop 1 for each of the plurality of ranges. Loop 1 includes execution of steps S32 to S34.

Adjuster 120 determines whether or not the range to be processed is an ineffective frequency band (S32).

If it is determined that the range to be processed is an ineffective frequency band (Yes in S32), adjuster 120 calculates the first offset value that is a value less than or equal to a first threshold value (S33).

If it is determined that the range to be processed is not an ineffective frequency band, i.e., the range to be processed is an effective frequency band (No in S32), adjuster 120 calculates the second offset value that is a value greater than the first threshold value (S34). Details of step S34 will be described with reference to FIG. 25.

After loop 1 has been executed for all of the plurality of ranges, adjuster 120 ends loop 1.

Figure 25:
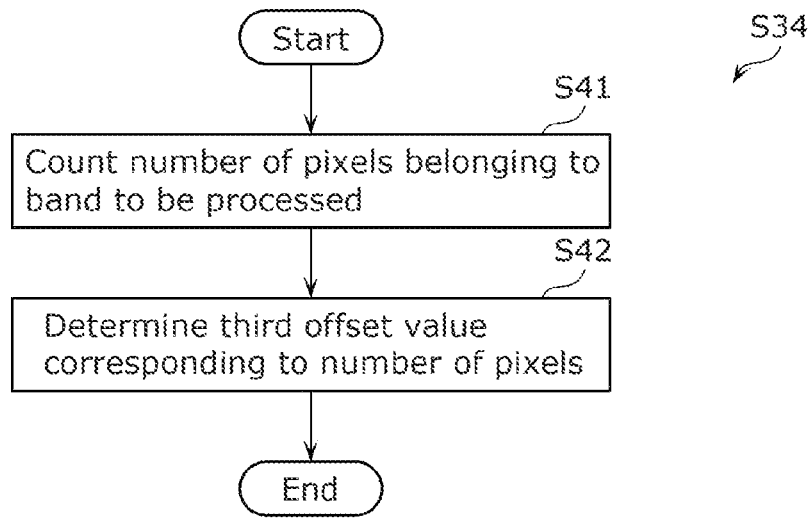
FIG. 25 is a flowchart of processing for calculating a second offset value.

FIG. 25 is a flowchart of the processing for calculating the second offset value.

Adjuster 120 counts the number of pixels that belong to the range to be processed (S41).

Adjuster 120 determines the third offset value that corresponds to the number of pixels belonging to the range to be processed, obtained by the counting (S42). Note that the third offset value may include the second offset value.

Figure 26:
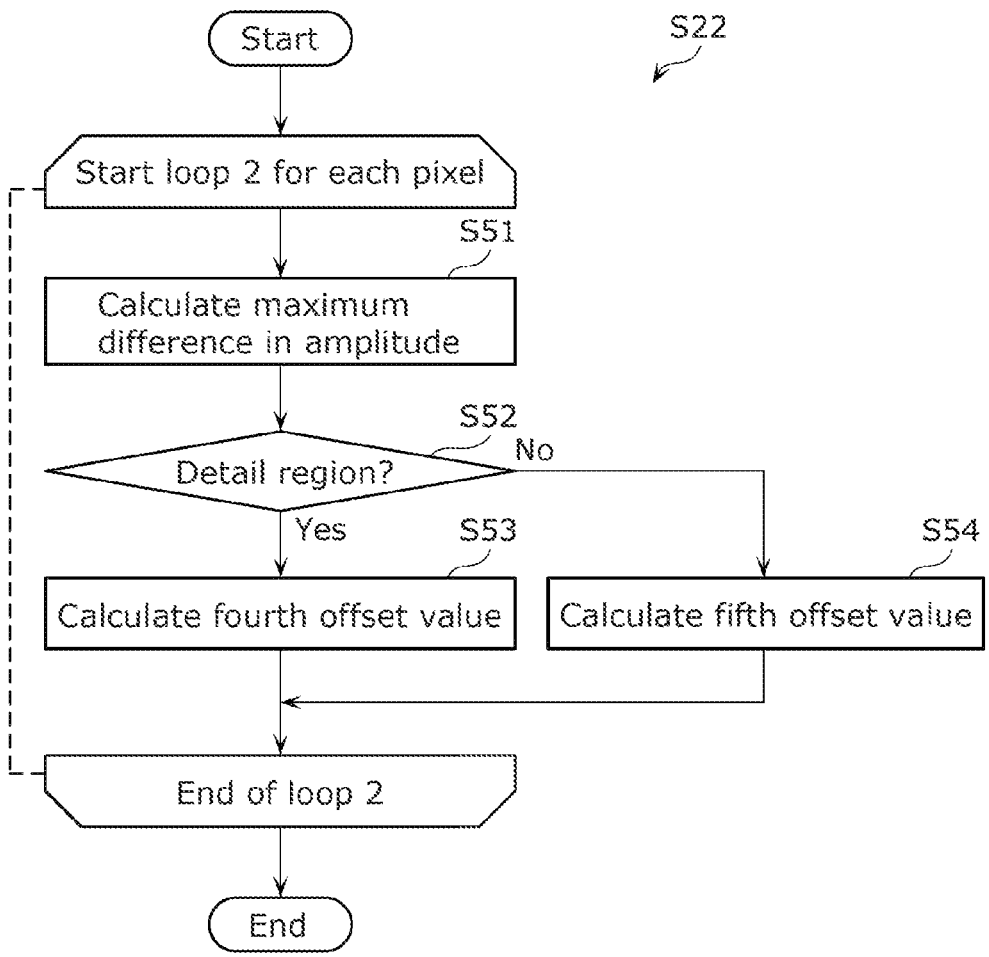
FIG. 26 is a flowchart of second calculation.

FIG. 26 is a flowchart of the second calculation.

Adjuster 120 starts loop 2 for each of the plurality of pixels in the video. Loop 2 includes execution of steps S51 to S54.

Adjuster 120 calculates a maximum difference in amplitude based on the pixel values of a plurality of pixels within a predetermined width in the horizontal or vertical direction with a pixel to be processed as a reference (center) (S51).

Adjuster 120 determines, on the basis of the calculated maximum difference, whether or not the pixel to be processed belongs to the detail region (S52). Specifically, adjuster 120 determines whether the calculated maximum difference is within a predetermined range. If the maximum difference is within the predetermined range, adjuster 120 determines that the pixel to be processed belongs to the detail region, and if the maximum difference is outside the predetermined range, adjuster 120 determines that the pixel to be processed belongs to a region other than the detail region.

If it is determined that the pixel to be processed belongs to the detail region (Yes in S52), adjuster 120 calculates the fourth offset value that is used to raise the sharpness gain for the pixel (S53).

If it is determined that the pixel to be processed does not belong to the detail region, e.g., it is determined that the pixel to be processed belongs to either of the plain region and the edge region (No in S52), adjuster 120 calculates the fifth offset value that is used to adjust the sharpness gain for the pixel (S54). The fifth offset value is a value smaller than the fourth offset value.

After loop 2 has been executed for all of the plurality of pixels, adjuster 120 ends loop 2.

FIG. 27 is a flowchart of processing for making sharpness gain adjustment to the video. Specifically, the entire processing illustrated in the flowchart in FIG. 27 is performed for each of a plurality of pixels in the video.

Adjuster 120 starts loop 3 for each of a plurality of ranges. Loop 3 includes execution of step S61.

Adjuster 120 adds the first offset value or the second offset value calculated for the range to be processed to the initial value for the sharpness gain (S61).

After loop 3 has been executed for all of the plurality of ranges, adjuster 120 ends loop 3.

Adjuster 120 adds the fourth offset value or the fifth offset value calculated for the pixel to be processed to the sharpness gain obtained as the result of step S61 corresponding to the pixel to be processed (S62).

Adjuster 120 generates pixel-contour-corrected data that is used in the contour correction processing, on the basis of the sharpness gain calculated for each pixel by executing the processing in step S62 (S63).

Meanwhile, adjuster 120 generates entire-contour-corrected data on the basis of the initial value for sharpness gains (S64).

Adjuster 120 adds the pixel-contour-corrected data obtained in step S63, the entire-contour-corrected data obtained in step S64, and the video data acquired from acquirer 110 in step S11 (S65). This produces video data in which sharpness gains are effectively adjusted.

Note that although adjuster 120 adds the calculated offset value to the initial value for sharpness gains in step S61, the offset value does not necessarily have to be added in this step to the initial value for sharpness gains. For example, adjuster 120 may specify an offset value to be added in step S61 and an offset value to be added in step S62 for each pixel, and add both of the offset value in step S61 and the offset value in step S62 to the initial value for sharpness gains. For example, adjuster 120 may previously execute loop 3 and step S64 in accordance with the cycle of updating the metadata (frequency information), previously add the result of loop 3 and the result of step S64, and further add, for each pixel, resultant data obtained by the previous addition to the result of step S62 that is executed in the cycle of pixels.

3. Advantageous Effects

Display system 100 according to the present embodiment is capable of making sharpness gain adjustment to the video while preventing the sharpness gain for the second region belonging to the second frequency band from exceeding the sharpness gain for the first region. Thus, during execution of the processing for achieving sharpness gains, it is possible to prevent the noise belonging to the second frequency band and caused during a period of time from when video obtained by image capturing is encoded in distribution system 200 to when the encoded video is decoded in display system 100 from being amplified more than in the first region. This reduces the possibility that the notice becomes more noticeable than the other part of the video due to the execution of the processing for achieving sharpness gains.

In display system 100 according to the present embodiment, adjuster 120 makes sharpness gain adjustment to the video by adding the first offset value, which is a value less than or equal to zero, to the sharpness gain for the second region. Accordingly, the sharpness gain adjustment to the video is made so as to lower or not to raise the sharpness gain for the second region belonging to the second frequency band in which the video is not present. Accordingly, during execution of the processing for achieving sharpness gains, it is possible to suppress the amplification of noise that belongs to the second frequency band and that is caused during a period of time from when video obtained by image capturing is encoded in distribution system 200 to when the encoded video is decoded in display system 100. In particular, because in many cases noise is contained in frequency bands higher than a predetermined frequency, degradation in image quality can be suppressed more effectively by making sharpness gain adjustment to the video so as to lower or not to raise the sharpness gain for the second region belonging to the second frequency band.

In display system 100 according to the present embodiment, adjuster 120 makes sharpness gain adjustment to the video by adding the second offset value, which is a value larger than zero, to the sharpness gain for the first region. This improves the sharpness gain for the first region in which the video is present and thereby effectively improves image quality.

In display system 100 according to the present embodiment, the first frequency band includes a plurality of different ranges. The second offset value includes a plurality of third offset values that correspond respectively to the plurality of ranges. Adjuster 120 counts, for each of the plurality of ranges, the number of pixels that belong to the range and determines the plurality of third offset values such that a greater value is assigned to a range for which a greater number of pixels is counted among the plurality of ranges. This raises sharpness gains with increasing numbers of pixels and thereby effectively improves image quality.

In display system 100 according to the present embodiment, adjuster 120 further calculates, for each of a plurality of pixels in the video, a maximum difference on the basis of the pixel values of a plurality of pixels within a predetermined width in the horizontal or vertical direction with the pixel as a reference. Adjuster 120 further makes sharpness gain adjustment to the video such that the fifth offset value that is further added to the sharpness gain for the second pixel whose maximum difference calculated is outside the predetermined range becomes smaller the fourth offset value that is further added to the sharpness gain for the first pixel whose maximum difference calculated is within the predetermined range. Accordingly, the sharpness gain adjustment is made such that the sharpness gain for the first pixel that is easy to improve image quality by raising the sharpness gain exceeds the sharpness gain for the second pixel. This effectively improves image quality.

4. Variations

Although in the embodiment described above, display system 100 includes controller 121 as the functional configuration, the display system does not necessarily have to include controller 121. That is, information that is described as being calculated by controller 121 may be acquired from external equipment or may be stored in advance in storage 122.

In the embodiment described above, display system 100 is configured to include tuner 101, and acquirer 110 is realized by tuner 101. However, the present disclosure is not limited to this example. Acquirer 110 may acquire video data by reading video data recorded on a storage medium (predetermined packaged medium) such as an optical disk. In this case, acquirer 110 may be realized by electrical equipment that includes an optical pickup for reading an optical disk. As another alternative, acquirer 110 may acquire video data from an external server via a network such as the Internet. In this case, acquirer 110 may be realized by a communication IF for establishing communication with the external server.

As described above, an embodiment of the present disclosure has been described by way of example of the technique disclosed in the present application. Attached drawings and detailed descriptions are provided to describe the embodiment.

Accordingly, the constituent elements illustrated in the attached drawings and described in the detailed descriptions may include not only essential constituent elements necessary to solve the problems, but also constituent elements that are not essential to solve the problem, in order to illustrate the above-described implementations. Therefore, such unessential constituent elements illustrated in the attached drawings and described in the detailed descriptions should not immediately be regarded as essential constituent elements.

The above-described embodiment is merely illustrative example of the technique according to the present disclosure, and therefore, various modifications, replacement, addition, and omission are possible within the scope of claims or within the equivalent region of the claims.

INDUSTRIAL APPLICABILITY

The present disclosure is effective for use as a video processing device, a video processing method, a video generation device, a video generation method, and a program that are capable of suppressing the amplification of noise caused by achieving sharpness gains.

The invention claimed is:

1. A video processing device comprising:
a control circuit; and
a non-transitory memory that stores a program, wherein:
the program, when executed by the control circuit, causes the control circuit to function as:
an acquirer that acquires video data that includes video and metadata, the metadata indicating a first frequency band that is a spatial frequency range in which the video is present;
an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band; and
an output device that outputs video adjusted by the adjuster,
the adjuster makes the sharpness gain adjustment to the video by adding a first offset value to the sharpness gain for the second region, the first offset value being a value less than or equal to a first threshold value, and by adding a second offset value to the sharpness gain for the first region, the second offset value being a value greater than the first threshold value, the first frequency band includes a plurality of ranges different from each other,
the second offset value includes a plurality of third offset values that correspond respectively to the plurality of ranges, and
the adjuster counts, for each of the plurality of ranges, a total number of pixels that belong to the range, and determines the plurality of third offset values such that a greater value is assigned to a range for which a greater number of pixels is counted among the plurality of ranges.

2. The video processing device according to claim 1, wherein the second frequency band is included in a range of frequencies lower than a minimum frequency that defines the first frequency band or in a range of frequencies higher than a maximum frequency that defines the first frequency band.

3. The video processing device according to claim 1, wherein the first threshold value is zero.

4. The video processing device according to claim 1, wherein the adjuster is further configured to:
calculate a maximum difference for each of a plurality of pixels in the video in accordance with pixel values of a plurality of pixels included within a predetermined width in a horizontal or vertical direction with the pixel as a reference; and
make sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range.

5. The video processing device according to claim 4, wherein the maximum difference that is within the predetermined range is a value smaller than the maximum difference that is outside the predetermined range or a value greater than the maximum difference that is outside the predetermined range.

6. The video processing device according to claim 4, wherein the fourth offset value is a value greater than zero, and
the fifth offset value is zero.

7. A video processing device comprising:
a control circuit; and
a non-transitory memory that stores a program, wherein:
the program, when executed by the control circuit, causes the control circuit to function as:
an acquirer that acquires video data that includes video and metadata, the metadata indicating a first frequency band that is a spatial frequency range in which the video is present;
an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band; and
an output device that outputs video adjusted by the adjuster,
the adjuster makes sharpness gain adjustment to the video by adding a first offset value to the sharpness gain for the second region, the first offset value being a value less than or equal to a first threshold value, and
the adjuster is further configured to:
calculate a maximum difference for each of a plurality of pixels in the video in accordance with pixel values of a plurality of pixels included within a predetermined width in a horizontal or vertical direction with the pixel as a reference; and
make sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range.

8. The video processing device according to claim 7, wherein the second frequency band is included in a range of frequencies lower than a minimum frequency that defines the first frequency band or in a range of frequencies higher than a maximum frequency that defines the first frequency band.

9. The video processing device according to claim 7, wherein the adjuster makes sharpness gain adjustment to the video by adding a second offset value to the sharpness gain for the first region, the second offset value being a value greater than the first threshold value.

10. The video processing device according to claim 9, wherein:
the first frequency band includes a plurality of ranges different from each other,
the second offset value includes a plurality of third offset values that correspond respectively to the plurality of ranges, and
the adjuster counts, for each of the plurality of ranges, a total number of pixels that belong to the range, and determines the plurality of third offset values such that a greater value is assigned to a range for which a greater number of pixels is counted among the plurality of ranges.

11. The video processing device according to claim 7, wherein the first threshold value is zero.

12. A video processing device comprising:
a control circuit; and
a non-transitory memory that stores a program, wherein:
the program, when executed by the control circuit, causes the control circuit to function as:
an acquirer that acquires video data that includes video and metadata, the metadata indicating a first frequency band that is a spatial frequency range in which the video is present;
an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band; and
an output device that outputs video adjusted by the adjuster,
the adjuster makes sharpness gain adjustment to the video by adding a first offset value to the sharpness gain for the second region, the first offset value being a value less than or equal to a first threshold value,
the adjuster is further configured to:
calculate a maximum difference for each of a plurality of pixels in the video in accordance with pixel values of a plurality of pixels included within a predetermined width in a horizontal or vertical direction with the pixel as a reference; and
make sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range, and
the maximum difference that is within the predetermined range is a value smaller than the maximum difference that is outside the predetermined range or a value greater than the maximum difference that is outside the predetermined range.

13. The video processing device according to claim 12, wherein the second frequency band is included in a range of frequencies lower than a minimum frequency that defines the first frequency band or in a range of frequencies higher than a maximum frequency that defines the first frequency band.

14. The video processing device according to claim 12, wherein the adjuster makes sharpness gain adjustment to the video by adding a second offset value to the sharpness gain for the first region, the second offset value being a value greater than the first threshold value.

15. The video processing device according to claim 14, wherein:
the first frequency band includes a plurality of ranges different from each other,
the second offset value includes a plurality of third offset values that correspond respectively to the plurality of ranges, and
the adjuster counts, for each of the plurality of ranges, a total number of pixels that belong to the range, and determines the plurality of third offset values such that a greater value is assigned to a range for which a greater number of pixels is counted among the plurality of ranges.

16. The video processing device according to claim 12, wherein the first threshold value is zero.

17. The video processing device according to claim 12, wherein:
the fourth offset value is a value greater than zero, and the fifth offset value is zero.

18. A video processing device comprising:
a control circuit; and
a non-transitory memory that stores a program, wherein:
the program, when executed by the control circuit, causes the control circuit to function as:
an acquirer that acquires video data that includes video and metadata, the metadata indicating a first frequency band that is a spatial frequency range in which the video is present;
an adjuster that makes sharpness gain adjustment to the video such that, among a plurality of regions of the video included in the video data acquired by the acquirer, a sharpness gain for a first region that belongs to the first frequency band indicated by the metadata exceeds a sharpness gain for a second region that belongs to a second frequency band that is a range outside the first frequency band; and
an output device that outputs video adjusted by the adjuster,
the adjuster makes sharpness gain adjustment to the video by adding a first offset value to the sharpness gain for the second region, the first offset value being a value less than or equal to a first threshold value,
the adjuster is further configured to:
calculate a maximum difference for each of a plurality of pixels in the video in accordance with pixel values of a plurality of pixels included within a predetermined width in a horizontal or vertical direction with the pixel as a reference; and make sharpness gain adjustment to the video such that a fourth offset value exceeds a fifth offset value, the fourth offset value being further added to a sharpness gain for a first pixel whose maximum difference calculated is within a predetermined range, and the fifth offset value being further added to a sharpness gain for a second pixel whose maximum difference calculated is outside the predetermined range, the fourth offset value is a value greater than zero, and the fifth offset value is zero.

19. The video processing device according to claim 18, wherein the second frequency band is included in a range of frequencies lower than a minimum frequency that defines the first frequency band or in a range of frequencies higher than a maximum frequency that defines the first frequency band.

20. The video processing device according to claim 18, wherein the adjuster makes sharpness gain adjustment to the video by adding a second offset value to the sharpness gain for the first region, the second offset value being a value greater than the first threshold value.

21. The video processing device according to claim 20, wherein:

the first frequency band includes a plurality of ranges different from each other, the second offset value includes a plurality of third offset values that correspond respectively to the plurality of ranges, and the adjuster counts, for each of the plurality of ranges, a total number of pixels that belong to the range, and determines the plurality of third offset values such that a greater value is assigned to a range for which a greater number of pixels is counted among the plurality of ranges.

22. The video processing device according to claim 18, wherein the first threshold value is zero.

* * * * *